(12) United States Patent
Fukase

(10) Patent No.: US 11,414,274 B2
(45) Date of Patent: Aug. 16, 2022

(54) WORK-PIECE FEEDING ASSEMBLY

(71) Applicant: Mitsuo Fukase, Toronto (CA)

(72) Inventor: Mitsuo Fukase, Toronto (CA)

( * ) Notice: Subject to any disclaimer, the term of this patent is extended or adjusted under 35 U.S.C. 154(b) by 36 days.

(21) Appl. No.: 16/035,829

(22) Filed: Jul. 16, 2018

(65) Prior Publication Data
US 2020/0017307 A1 Jan. 16, 2020

(51) Int. Cl.
*B65G 27/16* (2006.01)
*B65G 27/34* (2006.01)

(52) U.S. Cl.
CPC .............. *B65G 27/16* (2013.01); *B65G 27/34* (2013.01); *B65G 2207/30* (2013.01)

(58) Field of Classification Search
CPC ......... B65G 27/16; B65G 27/30; B65G 27/32
USPC ......................................... 198/753, 758, 773
See application file for complete search history.

(56) References Cited

U.S. PATENT DOCUMENTS

| | | | | |
|---|---|---|---|---|
| 3,786,912 A * | 1/1974 | Taylor | ...................... | B06B 3/00 198/761 |
| 4,020,942 A * | 5/1977 | Buchheit | ............... | B21B 43/003 198/600 |
| 4,446,959 A | 5/1984 | Dunlap | | |
| 4,513,882 A * | 4/1985 | Cabi-Akman | ......... | B65G 27/32 177/DIG. 11 |
| 4,651,869 A | 3/1987 | Grief | | |
| 5,042,643 A * | 8/1991 | Akama | .................. | B65G 27/32 198/572 |
| 5,285,890 A | 2/1994 | Stearns | | |
| 5,433,312 A * | 7/1995 | Foster | .................. | B65G 25/065 198/750.5 |
| 5,821,657 A * | 10/1998 | Falconer | ................. | B06B 1/045 310/85 |
| 6,044,710 A * | 4/2000 | Kurita | ....................... | B06B 3/00 73/664 |
| 6,105,753 A | 8/2000 | Graham | | |
| 6,206,180 B1 * | 3/2001 | Sekine | ................... | B65G 27/32 198/757 |
| 6,782,992 B2 | 8/2004 | Mimura et al. | | |
| 7,163,100 B2 * | 1/2007 | Dickinson | ............ | B65G 25/065 198/750.3 |
| 7,413,073 B2 * | 8/2008 | Narukawa | .............. | B65G 27/24 198/758 |
| 7,735,633 B2 * | 6/2010 | Kraus | ..................... | B65G 27/32 198/753 |
| 8,561,788 B2 * | 10/2013 | Knodell, Jr. | ........... | B65G 27/04 198/750.2 |
| 9,038,815 B2 * | 5/2015 | Kimura | .................. | B65G 47/26 198/758 |
| 9,266,683 B1 * | 2/2016 | Thomson | ............... | B65G 27/20 |

(Continued)

FOREIGN PATENT DOCUMENTS

| | | |
|---|---|---|
| CN | 102673959 | 9/2012 |
| EP | 1535866 | 7/2010 |
| KR | 19980035987 | 9/1998 |

*Primary Examiner* — Joseph A Dillon, Jr.
(74) *Attorney, Agent, or Firm* — Aird & McBurney LP

(57) ABSTRACT

A work-piece feeding assembly includes a first vibratory parts-transferring assembly, and a second vibratory parts-transferring assembly. The first vibratory parts-transferring assembly is for transferring a work piece along a first travel direction via a common parts-feeding path. The second vibratory parts-transferring assembly is for transferring the work piece along a second travel direction via the common parts-feeding path.

21 Claims, 12 Drawing Sheets

(56) References Cited

U.S. PATENT DOCUMENTS

| | | | | |
|---|---|---|---|---|
| 9,463,935 B1* | 10/2016 | Karpinsky | ............ | B65G 47/24 |
| 10,071,865 B2* | 9/2018 | Maggioni | ............ | B65G 47/846 |
| 10,828,734 B2* | 11/2020 | Li | ............ | B23P 19/048 |
| 11,046,528 B2* | 6/2021 | Olmstead | ............ | B65G 27/34 |
| 11,078,028 B1* | 8/2021 | Groves | ............ | B65G 27/02 |
| 2021/0213485 A1* | 7/2021 | Dumbaugh | ............ | F23K 1/00 |
| 2021/0292094 A1* | 9/2021 | Luckas | ............ | B65G 27/08 |

* cited by examiner

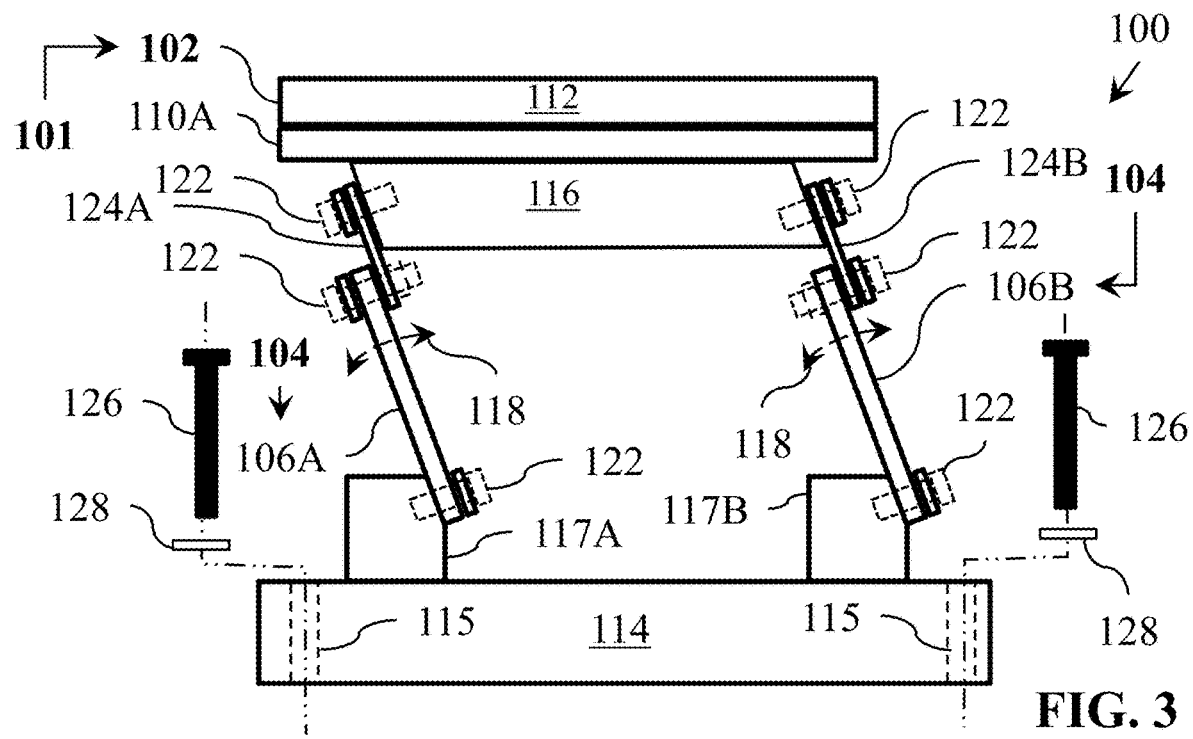
FIG. 3
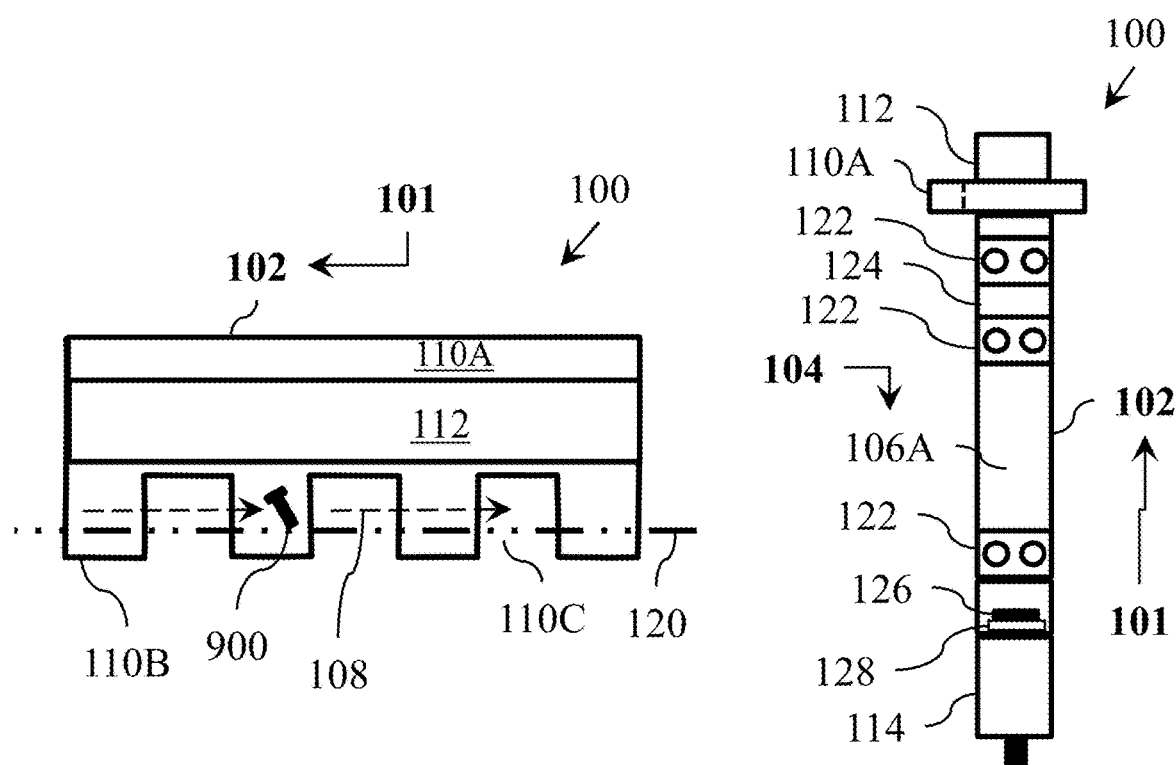
FIG. 5
FIG. 4

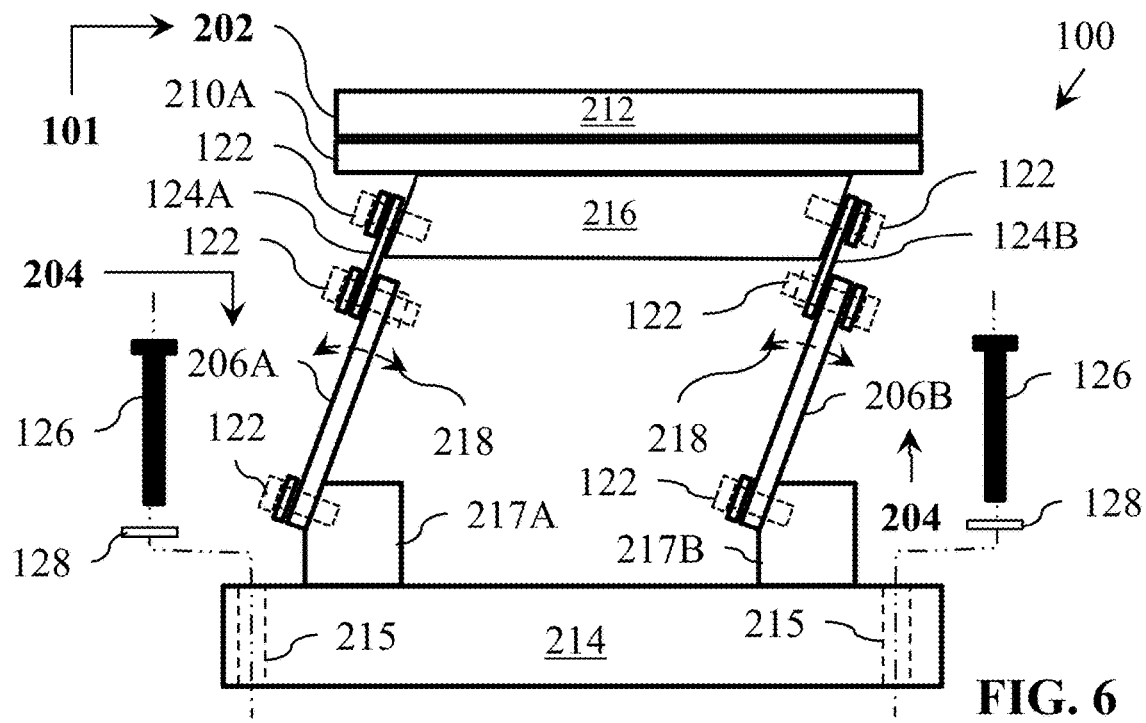
FIG. 6
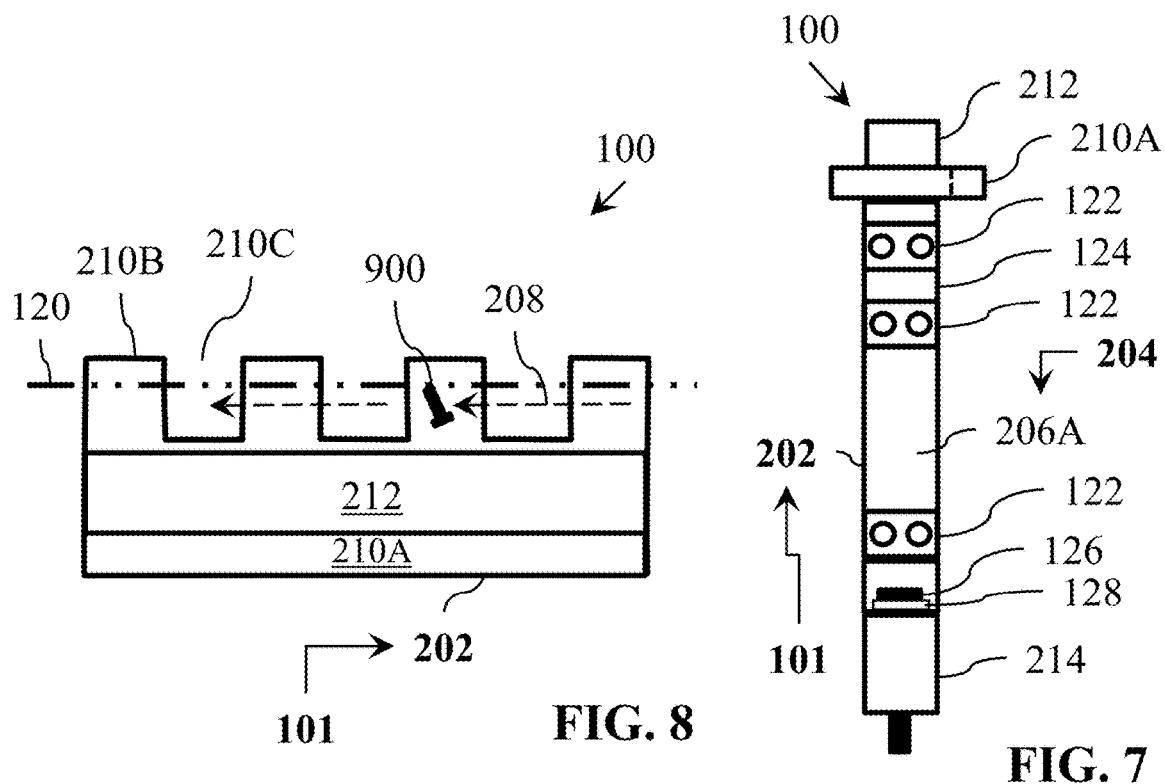
FIG. 8
FIG. 7

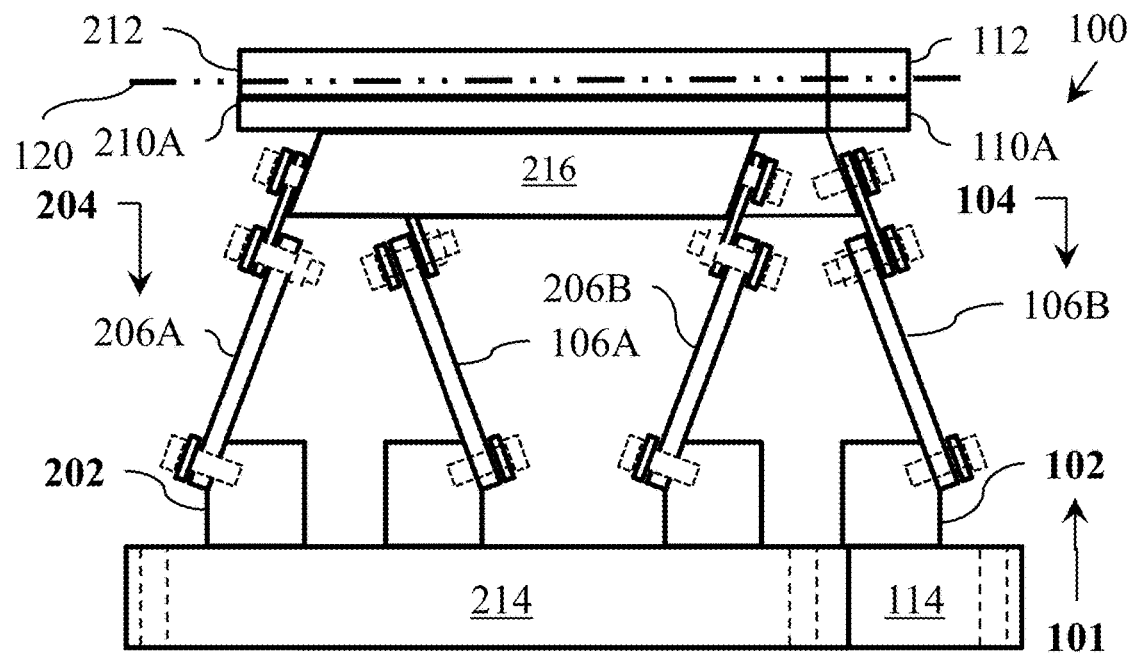
FIG. 9
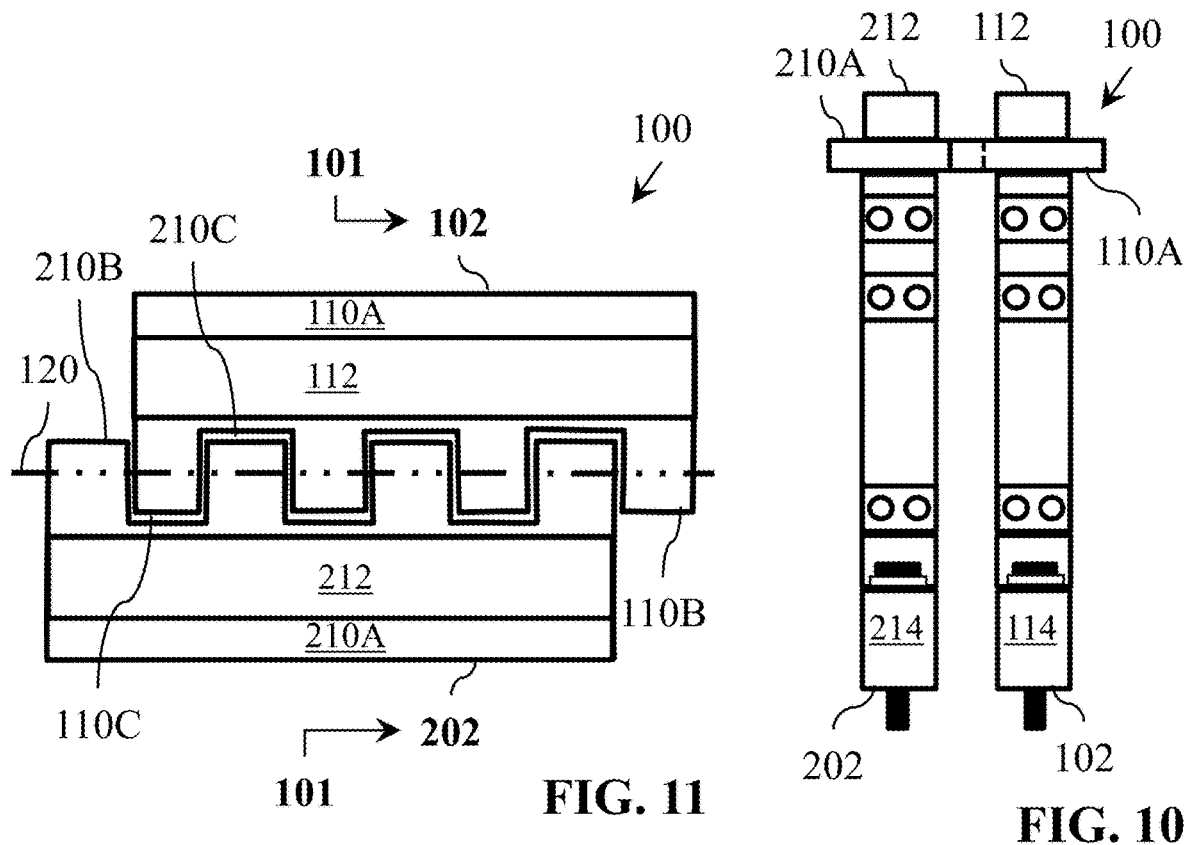
FIG. 11
FIG. 10

WORK-PIECE FEEDING ASSEMBLY

TECHNICAL FIELD

This document relates to the technical field of (and is not limited to) a work-piece feeding assembly including vibratory parts-transferring assemblies (and method associated therewith).

BACKGROUND

A vibratory feeder is an instrument that uses vibration to feed (move) material to a process and/or a machine.

SUMMARY

It will be appreciated that there exists a need to mitigate (at least in part) at least one problem associated with the existing vibratory feeders (also called the existing technology). After much study of the known systems and methods with experimentation, an understanding (at least in part) of the problem and its solution has been identified (at least in part) and is articulated (at least in part) as follows:

From time to time, the material (work pieces) moved by known vibratory feeders becomes jammed (unable to move), and the vibrations generated by the known vibratory feeders are not able to urge movement of the work pieces once they become jammed. Once the work pieces become jammed, a pressure (work piece pressure) is generated by the jammed work pieces. This condition may be called a product jam (work piece jam, etc.), and any equivalent thereof. Sometimes, utilizing too many parts (work pieces) in known vibratory feeders may cause jams (leading to reduced manufacturing efficiencies), while too few parts (work pieces) may result in an inadequate feed rate output (also leading to reduced manufacturing efficiencies).

A known technique for solving the jamming problem requires an operator (a person) to physically remove jammed parts from the known vibratory feeder. It would be desirable to have a vibratory feeder machine configured to prevent jamming of the material to be moved.

What is needed is a technical solution that may be more convenient than the known way to remove the jammed parts of the known vibratory feeder.

To mitigate, at least in part, at least one problem associated with the existing technology, there is provided (in accordance with a first major aspect) an apparatus. The apparatus includes a work-piece feeding assembly having a common parts-feeding path. The common parts-feeding path is configured to receive a work piece to be moved along the common parts-feeding path. The work-piece feeding assembly is configured to select between a first vibration motion and a second vibration motion once the work piece becomes jammed while attempting to travel along the common parts-feeding path. The first vibration motion is utilized to urge movement of the work piece along a first travel direction via the common parts-feeding path. The second vibration motion is utilized to urge movement of the work piece along a second travel direction via the common parts-feeding path.

To mitigate, at least in part, at least one problem associated with the existing technology, there is provided (in accordance with a second major aspect) a method of operating an apparatus. The method includes (involves) utilizing a work-piece feeding assembly having a common parts-feeding path configured to receive a work piece to be moved along the common parts-feeding path. The method also includes selecting between a first vibration motion and a second vibration motion once the work piece becomes jammed while the work piece attempts to travel along the common parts-feeding path. The first vibration motion is utilized to urge movement of the work piece along a first travel direction via the common parts-feeding path. The second vibration motion is utilized to urge movement of the work piece along a second travel direction via the common parts-feeding path.

To mitigate, at least in part, at least one problem associated with the existing technology, there is provided (in accordance with a third major aspect) an apparatus. The apparatus includes a work-piece feeding assembly configured to (A) selectively transfer, by way of a first vibration motion, a work piece along a first travel direction via a common parts-feeding path; and the work-piece feeding assembly is also configured to selectively transfer, by way of a second vibration motion, the work piece along a second travel direction via the common parts-feeding path (that is once the work piece becomes jammed while attempting to travel along the common parts-feeding path).

To mitigate, at least in part, at least one problem associated with the existing technology, there is provided (in accordance with a fourth major aspect) an apparatus. The apparatus includes and is not limited to (comprises) a work-piece feeding assembly. The work-piece feeding assembly includes (and is not limited to) a first vibratory parts-transferring assembly. The work-piece feeding assembly also includes (and is not limited to) a second vibratory parts-transferring assembly. The first vibratory parts-transferring assembly is for transferring a work piece along a first travel direction via a common parts-feeding path. The second vibratory parts-transferring assembly is for transferring the work piece along a second travel direction via the common parts-feeding path.

To mitigate, at least in part, at least one problem associated with the existing technology, there is provided (in accordance with a fifth major aspect) a method. The method is for operating a work-piece feeding assembly. The work-piece feeding assembly includes (and is not limited to) a first vibratory parts-transferring assembly. The work-piece feeding assembly also includes (and is not limited to) a second vibratory parts-transferring assembly. The method includes and is not limited to (comprises) using the first vibratory parts-transferring assembly for transferring a work piece along a first travel direction via a common parts-feeding path. The method also includes (and is not limited to) using the second vibratory parts-transferring assembly for transferring the work piece along a second travel direction via the common parts-feeding path.

To mitigate, at least in part, at least one problem associated with the existing technology, there is provided (in accordance with a sixth major aspect) an apparatus. The apparatus includes and is not limited to (comprises) a work-piece feeding assembly. The work-piece feeding assembly includes and is not limited to (comprises) a first vibratory parts-transferring assembly configured to be selectively vibrated. The work-piece feeding assembly also includes and is not limited to (comprises) a second vibratory parts-transferring assembly configured to be selectively vibrated. The first vibratory parts-transferring assembly and the second vibratory parts-transferring assembly define (have) a common parts-feeding path. The first vibratory parts-transferring assembly is configured to selectively transfer a work piece along a first travel direction via the common parts-feeding path in response to selective activation of the first vibratory parts-transferring assembly, and in response to selective deactivation of the second vibratory parts-transferring assembly. The second vibratory parts-transferring assembly is configured to selectively transfer the work piece along a second travel direction via the common parts-feeding path in response to selective activation of the second vibratory parts-transferring assembly, and in response to selective deactivation of the first vibratory parts-transferring assembly. The first travel direction and the second travel direction are opposite to each other, and are aligned along the common parts-feeding path.

To mitigate, at least in part, at least one problem associated with the existing technology, there is provided (in accordance with a seventh major aspect) a method. The method is for operating a work-piece feeding assembly. The work-piece feeding assembly includes and is not limited to (comprises) a first vibratory parts-transferring assembly configured to be selectively vibrated. The work-piece feeding assembly also includes and is not limited to (comprises) a second vibratory parts-transferring assembly configured to be selectively vibrated. The first vibratory parts-transferring assembly and the second vibratory parts-transferring assembly define (have) a common parts-feeding path. The first travel direction and the second travel direction are opposite to each other, and are aligned along the common parts-feeding path. The method includes and is not limited to (comprises) using the first vibratory parts-transferring assembly to selectively transfer a work piece along a first travel direction via the common parts-feeding path in response to selective activation of the first vibratory parts-transferring assembly, and in response to selective deactivation of the second vibratory parts-transferring assembly. The method also includes and is not limited to (comprises) using the second vibratory parts-transferring assembly to selectively transfer the work piece along a second travel direction via the common parts-feeding path in response to selective activation of the second vibratory parts-transferring assembly, and in response to selective deactivation of the first vibratory parts-transferring assembly.

To mitigate, at least in part, at least one problem associated with the existing technology, there is provided (in accordance with an eighth major aspect) an apparatus. The apparatus includes and is not limited to (comprises) a work-piece feeding assembly. The work-piece feeding assembly includes and is not limited to (comprises) a first vibratory parts-transferring assembly having a first vibration unit configured to be selectively activated (this is done in such a way that the first vibration unit, in use, selectively vibrates the first vibratory parts-transferring assembly. The work-piece feeding assembly also includes and is not limited to (comprises) a second vibratory parts-transferring assembly having a second vibration unit configured to be selectively activated (this is done in such a way that the second vibratory parts-transferring assembly, in use, selectively vibrates the second vibratory parts-transferring assembly). The first vibratory parts-transferring assembly and the second vibratory parts-transferring assembly have (define) a common parts-feeding path. The first vibratory parts-transferring assembly is configured to selectively transfer a work piece along a first travel direction via the common parts-feeding path in response to selective activation of the first vibration unit, and in response to selective deactivation of the second vibration unit. The second vibratory parts-transferring assembly is configured to selectively transfer the work piece along a second travel direction via the common parts-feeding path in response to selective activation of the second vibration unit, and in response to selective deactivation of the first vibration unit. The first travel direction and the second travel direction are opposite to each other, and are aligned along the common parts-feeding path.

To mitigate, at least in part, at least one problem associated with the existing technology, there is provided (in accordance with a ninth major aspect) a method. The method is for operating a work-piece feeding assembly. The work-piece feeding assembly includes (and is not limited to) a first vibratory parts-transferring assembly having a first vibration unit configured to be selectively activated in such a way that the first vibration unit, in use, selectively vibrates the first vibratory parts-transferring assembly. The work-piece feeding assembly also includes (and is not limited to) a second vibratory parts-transferring assembly having a second vibration unit configured to be selectively activated in such a way that the second vibratory parts-transferring assembly, in use, selectively vibrates the second vibratory parts-transferring assembly (once the second vibration unit, in use, is selectively activated). The first vibratory parts-transferring assembly and the second vibratory parts-transferring assembly have (define) a common parts-feeding path. The first travel direction and the second travel direction are opposite to each other, and are aligned along the common parts-feeding path. The method includes and is not limited to (comprises) using the first vibratory parts-transferring assembly to selectively transfer (feed) a work piece along a first travel direction via the common parts-feeding path in response to selective activation of the first vibration unit, and in response to selective deactivation of the second vibration unit. The method includes and is not limited to (comprises) using the second vibratory parts-transferring assembly to selectively transfer (feed) the work piece along a second travel direction via the common parts-feeding path in response to selective activation of the second vibration unit, and in response to selective deactivation of the first vibration unit.

To mitigate, at least in part, at least one problem associated with the existing technology, there is provided (in accordance with a first major aspect) an apparatus. The apparatus, comprises: a work-piece feeding assembly having a common parts-feeding path configured to receive a work piece to be moved along the common parts-feeding path; and the work-piece feeding assembly, in use, selecting between a first vibration motion and a second vibration motion once the work piece becomes jammed while attempting to travel along the common parts-feeding path, in which: the first vibration motion is utilized to urge movement of the work piece along a first travel direction via the common parts-feeding path; and the second vibration motion is utilized to urge movement of the work piece along a second travel direction via the common parts-feeding path.

To mitigate, at least in part, at least one problem associated with the existing technology, there is provided (in accordance with a first major aspect) an apparatus. The apparatus, comprises: a work-piece feeding assembly, including: a first vibratory parts-transferring assembly being selectively vibrated once activated to vibrate; and a second vibratory parts-transferring assembly being selectively vibrated once activated to vibrate; and the first vibratory parts-transferring assembly and the second vibratory parts-transferring assembly having a common parts-feeding path; and the first vibratory parts-transferring assembly selectively transferring, once activated, a work piece along a first travel direction via the common parts-feeding path in response to selective activation of the first vibratory parts-transferring assembly, and in response to selective deactivation of the second vibratory parts-transferring assembly; and the second vibratory parts-transferring assembly selectively transferring, once activated, the work piece along a second travel direction via the common parts-feeding path in response to selective activation of the second vibratory parts-transferring assembly, and in response to selective deactivation of the first vibratory parts-transferring assembly; and wherein the first travel direction and the second travel direction are opposite to each other, and are aligned along the common parts-feeding path. Preferably, the work-piece feeding assembly selects, in use, between a first vibration motion and a second vibration motion once the work piece becomes jammed while attempting to travel along the common parts-feeding path, in which: the first vibration motion is utilized to urge movement of the work piece along the first travel direction via the common parts-feeding path; and the second vibration motion is utilized to urge movement of the work piece along the second travel direction via the common parts-feeding path.

To mitigate, at least in part, at least one problem associated with the existing technology, there is provided (in accordance with a first major aspect) an apparatus. The apparatus, comprises: a work-piece feeding assembly, including: a first vibratory parts-transferring assembly having a first vibration unit selectively activated, in use, in such a way that the first vibration unit, in use, selectively vibrates the first vibratory parts-transferring assembly; this is done once the first vibration unit, in use, is selectively activated; and a second vibratory parts-transferring assembly having a second vibration unit selectively activated, in use, in such a way that the second vibratory parts-transferring assembly, in use, selectively vibrates the second vibratory parts-transferring assembly once the second vibration unit, in use, is selectively activated; and the first vibratory parts-transferring assembly and the second vibratory parts-transferring assembly having a common parts-feeding path; and the first vibratory parts-transferring assembly selectively transferring, in use, a work piece along a first travel direction via the common parts-feeding path in response to selective activation of the first vibration unit, and in response to selective deactivation of the second vibration unit; and the second vibratory parts-transferring assembly selectively transferring, in use, the work piece along a second travel direction via the common parts-feeding path in response to selective activation of the second vibration unit, and in response to selective deactivation of the first vibration unit; and wherein the first travel direction and the second travel direction are opposite to each other, and are aligned along the common parts-feeding path.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify key features or essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 3, FIG. 4 and FIG. 5 depict a side view (FIG. 3), a front view (FIG. 4) and a top view (FIG. 5) of embodiments of the work-piece feeding assembly including the first vibratory parts-transferring assembly of FIG. 2; and FIG. 6, FIG. 7 and FIG. 8 depict a side view (FIG. 6), a front view (FIG. 7) and a top view (FIG. 8) of embodiments of the work-piece feeding assembly including the second vibratory parts-transferring assembly of FIG. 2; and FIG. 9, FIG. 10 and FIG. 11 depict a side view (FIG. 9), a front view (FIG. 10) and a top view (FIG. 11) of embodiments of the work-piece feeding assembly of FIG. 2.

Figure 1:
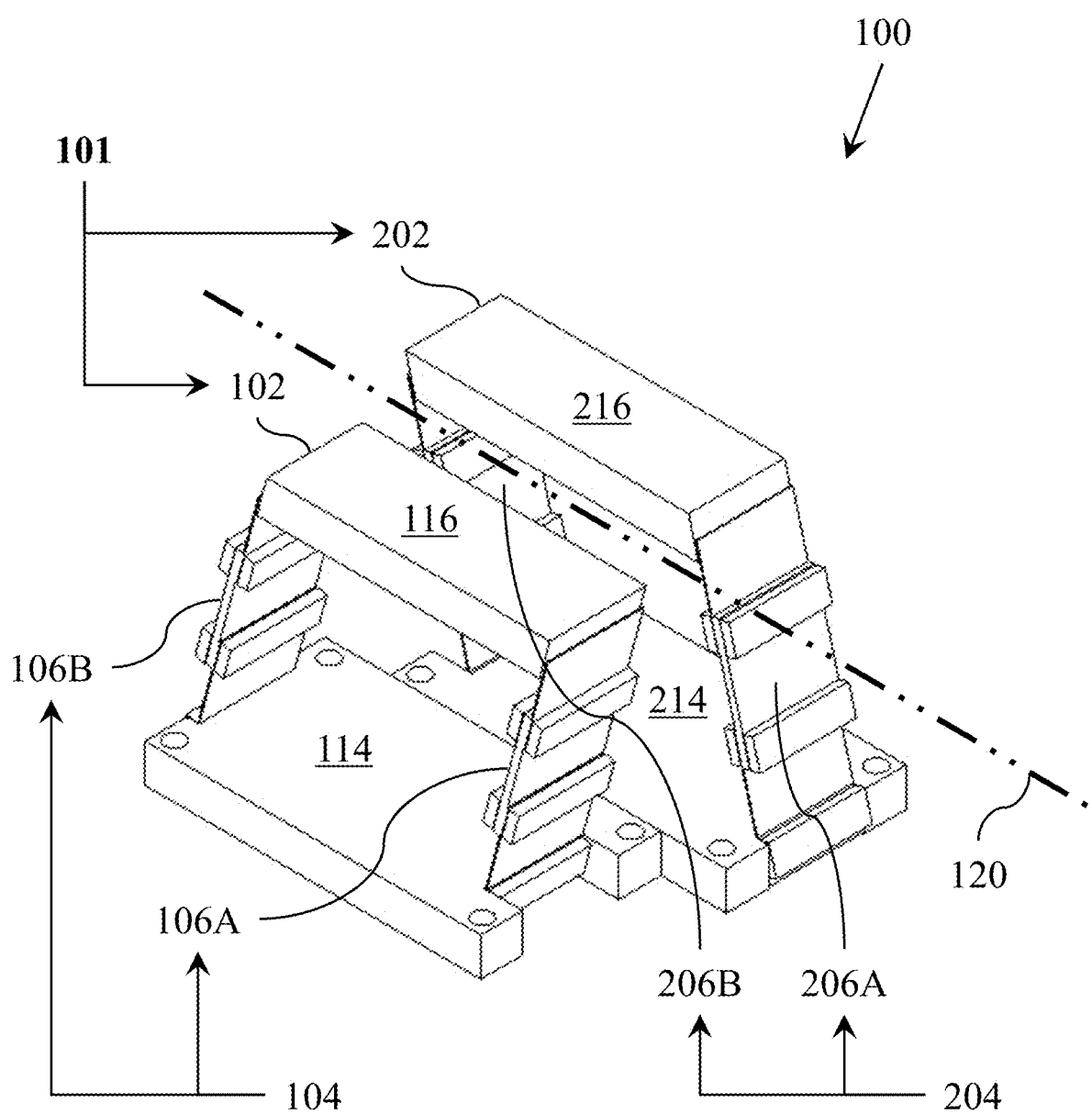
FIG. 1 and FIG. 2 depict perspective views of embodiments of a work-piece feeding assembly including a first vibratory parts-transferring assembly and a second vibratory parts-transferring assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED
IN THE DRAWINGS 100 apparatus
101 work-piece feeding assembly
102 first vibratory parts-transferring assembly
104 first vibration unit
106A first piezo device
106B second piezo device
108 first travel direction
110A first plate assembly
110B first castellation formation
110C first plate gap 111 first plate mounting hole
112 first guide rail
114 first base assembly
115 first base mounting hole
116 first plate support
117A first base extension
117B second base extension
118 first vibration motion
119A first plate cover portion
119B second plate cover portion
120 common parts-feeding path
122 connector
124 extension member
124A first extension member
124B second extension member
126 coupler device
128 washer
129 cover assembly
130 cover connector
132 cover gap
202 second vibratory parts-transferring assembly
204 second vibration unit
206A first piezo mechanism
206B second piezo mechanism
208 second travel direction
210A second plate assembly
210B second castellation formation
210C second plate gap
211 second plate mounting hole
212 second guide rail
214 second base assembly
215 second base mounting hole
216 second plate support
217A first base portion
217B second base portion
218 second vibration motion
219A third plate cover portion
219B fourth plate cover portion
900 work piece

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the claim is defined by the claims (in which the claims may be amended during patent examination after the filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

Figure 2:
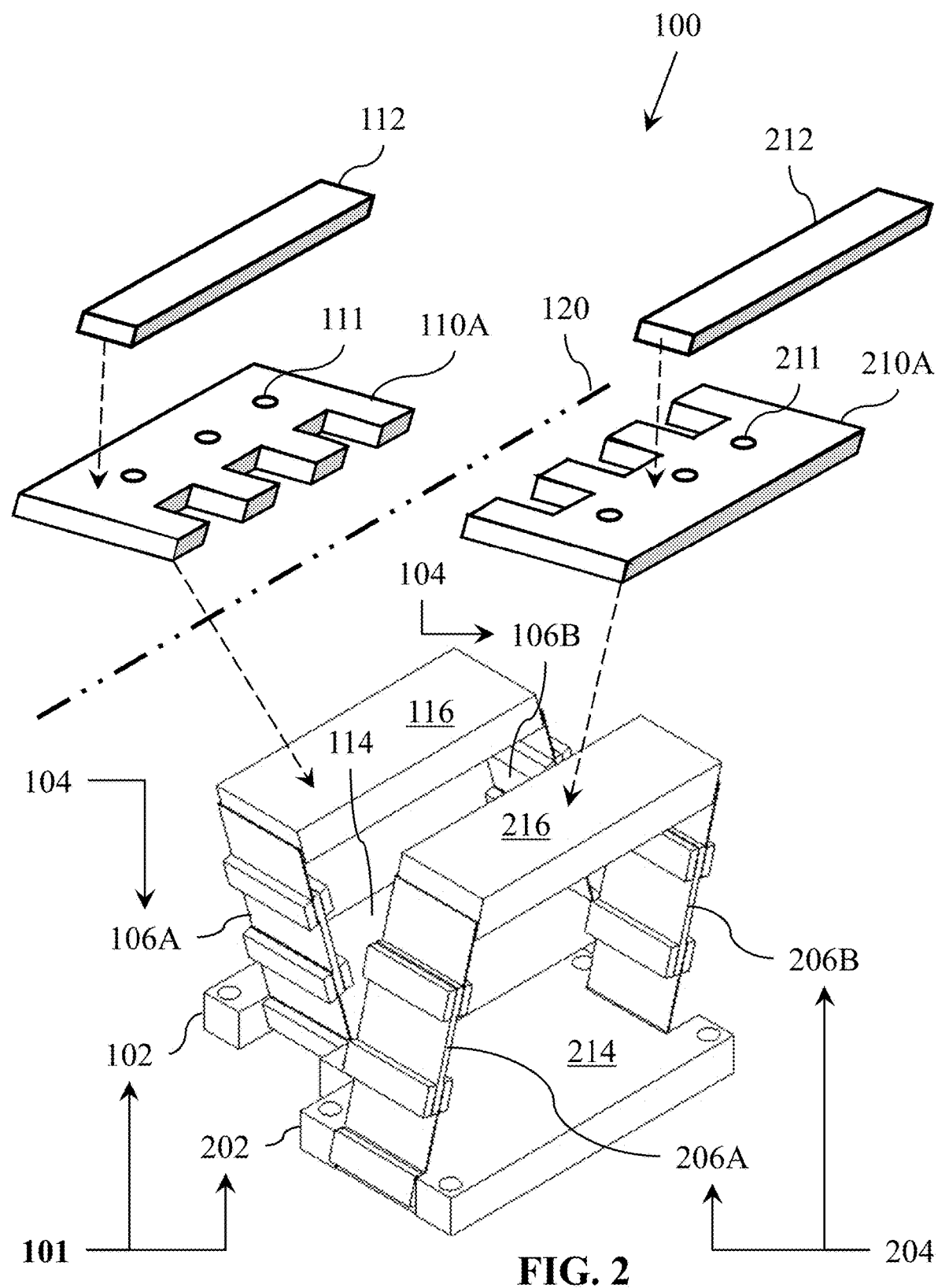

FIG. 1 and FIG. 2 depict perspective views of embodiments of a work-piece feeding assembly 101 including a first vibratory parts-transferring assembly 102 and a second vibratory parts-transferring assembly 202.

Referring to the embodiment as depicted in FIG. 1, an apparatus 100 includes, and is not limited to, a work-piece feeding assembly 101. The work-piece feeding assembly 101 includes (and is not limited to) a first vibratory parts-transferring assembly 102. The first vibratory parts-transferring assembly 102 includes (and is not limited to) a first vibration unit 104. The first vibration unit 104 includes any type of vibratory drive, such as (and not limited to) an electromagnetic device, a cam motor configured to beat, etc., and any equivalent thereof. Preferably, the first vibration unit 104 includes a piezoelectric (piezo) vibratory drive (and any equivalent thereof). The vibration amplitude generated by the piezoelectric vibratory drive is relatively smaller so that any gaps between the elements (of the first vibratory parts-transferring assembly 102) to be vibrated may remain relatively smaller (so as to not interfere with the movement of the work pieces to be moved by the first vibratory parts-transferring assembly 102). The first vibration unit 104 includes (and is not limited to) a first piezo device 106A (also called a first piezoelectric device) and a second piezo device 106B (also called a second piezoelectric device). Preferably, the first piezo device 106A and the second piezo device 106B are spaced apart from each other.

Preferably, the first piezo device 106A and the second piezo device 106B are equivalent to each other (that is, the same device).

Referring to the embodiment as depicted in FIG. 1, preferably, the first piezo device 106A and the second piezo device 106B each includes (and is not limited to) a piezo vibration device, such as a piezoelectric resonator, a piezoelectric actuator, and any equivalent thereof. The piezoelectric resonator is an electronic component configured to provide oscillation (mechanical oscillations) in response to the application of electricity to the piezoelectric resonator. The piezoelectric actuator is a device based on counter piezoelectric effect. The application of a voltage (electricity) to the piezoelectric actuator, in use, creates a mechanical displacement, and/or the piezoelectric actuator (in use) generates a voltage (Alternating Current or AC, etc.). The piezoelectric actuator is controllable (electrically controllable). For instance, the piezoelectric actuator may include (and is not limited to) the MODEL NUMBER PJFV SERIES piezoelectric actuator manufactured by MURATA MANUFACTURING CO., LIMITED, based in Japan, and any equivalent thereof.

Referring to the embodiment as depicted in FIG. 1, the first vibration unit 104 further includes (and is not limited to) a first base assembly 114, and also includes a first plate support 116. The first base assembly 114 and the first plate support 116 are spaced apart from each other. The first base assembly 114 spans between (and connects to or affixes to) the first sections (the lower sections, the first respective sections) of the first piezo device 106A and the second piezo device 106B. The first plate support 116 spans between (and connects to or affixes to) the upper sections of the first piezo device 106A and the second piezo device 106B. Preferably, the first base assembly 114, the first plate support 116, the first piezo device 106A and the second piezo device 106B are attached to each other in such a way that they form (provide) a first parallelogram structure.

Referring to the embodiment as depicted in FIG. 1, the work-piece feeding assembly 101 further includes (and is not limited to) a second vibratory parts-transferring assembly 202. The first vibratory parts-transferring assembly 102 and the second vibratory parts-transferring assembly 202 are positioned relative to each other in a cooperative arrangement. The first vibratory parts-transferring assembly 102 and the second vibratory parts-transferring assembly 202 are spaced apart from each other. The second vibratory parts-transferring assembly 202 includes (and is not limited to) a second vibration unit 204. The second vibration unit 204 includes any type of vibratory drive, such as (and not limited to) an electromagnetic device, a cam motor configured to beat, etc., and any equivalent thereof. Preferably, the second vibration unit 204 includes a piezoelectric vibratory drive (and any equivalent thereof). Preferably, the vibration amplitude generated by the piezoelectric vibratory drive is relatively smaller so that any gaps between the elements (of the second vibratory parts-transferring assembly 202) to be vibrated may remain relatively smaller (so as to not interfere with the movement of the work pieces to be moved by the second vibratory parts-transferring assembly 202). The second vibration unit 204 includes (and is not limited to) a first piezo mechanism 206A (also called a first piezoelectric mechanism) and a second piezo mechanism 206B (also called a second piezoelectric mechanism). Preferably, the first piezo mechanism 206A and the second piezo mechanism 206B are equivalent to each other. The first piezo mechanism 206A and the second piezo mechanism 206B are spaced apart from each other. Preferably, the first piezo device 106A, the second piezo device 106B, the first piezo mechanism 206A and the second piezo mechanism 206B are equivalent to each other.

Referring to the embodiment as depicted in FIG. 1, preferably, the first piezo mechanism 206A and the second piezo mechanism 206B each includes (and is not limited to) a piezo vibration device, such as a piezoelectric resonator, a piezoelectric actuator, and any equivalent thereof. The piezoelectric resonator is an electronic component configured to provide mechanical oscillation in response to the application of electricity (voltage and/or current) to the piezoelectric resonator. The piezoelectric actuator is a device based on counter piezoelectric effect. The application of a voltage (electricity) to the piezoelectric actuator creates a mechanical displacement, and vibrating the piezoelectric actuator generates a voltage (AC voltage). The piezoelectric actuator is (preferably) electrically controllable. The piezoelectric actuator may include the MODEL NUMBER PJFV SERIES piezoelectric actuator manufactured by MURATA MANUFACTURING CO., LIMITED, based in Japan (and any equivalent thereof).

Referring to the embodiment as depicted in FIG. 1, the second vibration unit 204 further includes (and is not limited to) a second base assembly 214 and a second plate support 216. The second base assembly 214 and the second plate support 216 are spaced apart from each other. The second base assembly 214 spans between (and connects to) the first sections (the lower sections) of the first piezo mechanism 206A and the second piezo mechanism 206B. The second plate support 216 spans between (and connects to) the second sections (the upper sections, respective second sections) of the first piezo mechanism 206A and the second piezo mechanism 206B. The second base assembly 214, the second plate support 216, the first piezo mechanism 206A and the second piezo mechanism 206B are attached to form (provide) a second parallelogram structure.

Referring to the embodiment as depicted in FIG. 1, the first vibratory parts-transferring assembly 102 and the second vibratory parts-transferring assembly 202 share a common parts-feeding path 120 (once the first vibratory parts-transferring assembly 102 and the second vibratory parts-transferring assembly 202 are positioned relative to each other in a cooperative arrangement). The common parts-feeding path 120 may be referred to as a riding surface or a common lane or a shared lane, and any equivalent thereof.

Referring to the embodiment as depicted in FIG. 1, the first vibration unit 104 includes a first piezo device 106A and a second piezo device 106B each of which are configured to vibrate the first plate assembly 110A. The second vibration unit 204 includes a first piezo mechanism 206A and a second piezo mechanism 206B each of which are configured to vibrate the second plate assembly 210A.

Referring to the embodiment as depicted in FIG. 1, the first vibratory parts-transferring assembly 102 and the second vibratory parts-transferring assembly 202 are elongated (linearly elongated) drives. The first vibratory parts-transferring assembly 102 and the second vibratory parts-transferring assembly 202 are positioned side by side or to sit (to be positioned) in a side-by-side arrangement (preferably, they face each other).

Referring to the embodiment as depicted in FIG. 2, the first vibration unit 104 includes (and is not limited to) a first plate assembly 110A. The first plate assembly 110A is configured to be attachable to (a top surface of) the first plate support 116. For instance, the first plate assembly 110A includes a first plate mounting hole 111. A bolt or connector (known and not depicted) is configured to securely affix the first plate assembly 110A to the first plate support 116. The first plate assembly 110A defines (provides) a first castellation formation 110B (details of which are further depicted in FIG. 5). The first castellation formation 110B extends along a length (a linear length) of one side of the first plate assembly 110A. The first castellation formation 110B may also be referred to as a set of spaced-apart teeth (extending members or extending portions).

A castellation is a structure that resembles an aspect of a castle, especially with turrets and battlements, or parapets with spaced notches (or regularly spaced notches) positioned in between the parapets.

Referring to the embodiment as depicted in FIG. 2, the second vibration unit 204 includes (and is not limited to) a second plate assembly 210A. The second plate assembly 210A is configured to be attachable to (a top surface of) the second plate support 216. For instance, the second plate assembly 210A includes a second plate mounting hole 211. A bolt or connector (known and not depicted) is configured to securely affix the second plate assembly 210A to the second plate support 216. The second plate assembly 210A defines (provides) a second castellation formation 210B (details of which are depicted in FIG. 8). The second castellation formation 210B extends along a length (a linear length) of one side of the second plate assembly 210A. The second castellation formation 210B may also be referred to as a set of spaced-apart teeth (extending members or extending portions).

Referring to the embodiment as depicted in FIG. 2, the first castellation formation 110B of the first plate assembly 110A and the second castellation formation 210B of the second plate assembly 210A are configured to interlace (mesh) with each other, or to fit together. The first plate assembly 110A (which is affixed to the first vibration unit 104) and the second plate assembly 210A (which is affixed to the second vibration unit 204) are configured to freely vibrate independently of each other (in use). Preferably, a gap is formed between the first plate assembly 110A and the second plate assembly 210A once the first vibration unit 104 and the second vibration unit 204 are positioned side-by-side (in a side-by-side relationship relative to each other). For the case where the first vibration unit 104 and the second vibration unit 204 each includes a piezoelectric vibratory drive, the vibration amplitude generated by the piezoelectric vibratory drives is relatively smaller so that the gap that is formed between the first plate assembly 110A and the second plate assembly 210A (to be vibrated) may remain relatively smaller. A gap is formed between the first castellation formation 110B of the first plate assembly 110A and the second castellation formation 210B of the second plate assembly 210A (once they are made to interlace and mesh with each other).

Referring to the embodiment as depicted in FIG. 2, a first guide rail 112 is mounted (affixed) to a top section of the first plate assembly 110A. A second guide rail 212 is mounted (affixed) to a top section of the second plate assembly 210A. The first guide rail 112 is spaced apart from the second guide rail 212 (once they are mounted accordingly). The common parts-feeding path 120 is aligned parallel to the first guide rail 112 and the second guide rail 212. The common parts-feeding path 120 is aligned coaxially with the first guide rail 112 and the second guide rail 212.

Referring to the embodiment as depicted in FIG. 2, the first vibratory parts-transferring assembly 102 and the second vibratory parts-transferring assembly 202 are configured to be positioned, at least in part, in a side-by-side relationship with each other. The first vibratory parts-transferring assembly 102 and the second vibratory parts-transferring assembly 202 have (define) the common parts-feeding path 120 (once the first vibratory parts-transferring assembly 102 and the second vibratory parts-transferring assembly 202, in use, are positioned, at least in part, in a side-by-side relationship with each other).

FIG. 3, FIG. 4 and FIG. 5 depict a side view (FIG. 3), a front view (FIG. 4) and a top view (FIG. 5) of embodiments of the work-piece feeding assembly 101 including the first vibratory parts-transferring assembly 102 of FIG. 2.

Referring to the embodiments as depicted in FIG. 3, FIG. 4 and FIG. 5, the work-piece feeding assembly 101 includes (and is not limited to) the first vibratory parts-transferring assembly 102. Preferably, the first vibratory parts-transferring assembly 102 includes the first vibration unit 104. Preferably, the first vibration unit 104 includes the first piezo device 106A and the second piezo device 106B (which are spaced apart from each other). The first guide rail 112 is affixed to the top surface (section) of the first plate assembly 110A. The first plate assembly 110A is affixed to the first plate support 116. The first base assembly 114 is spaced apart from the first plate support 116. A first base extension 117A extends upwardly from the first base assembly 114. A second base extension 117B extends from the first base assembly 114. The first base extension 117A is spaced apart from the second base extension 117B. One end of the first piezo device 106A is affixed to the first base extension 117A (by way of the connector 122). One end of the second piezo device 106B is affixed to the second base extension 117B (by way of the connector 122). The opposite end of the first piezo device 106A is affixed to the first extension member 124A (by way of the connector 122). The opposite end of the second piezo device 106B is affixed to the second extension member 124B (by way of the connector 122). The first extension member 124A is affixed to an end portion of the first plate support 116 (by way of the connector 122). The second extension member 124B is affixed to an opposite end portion of the first plate support 116 (by way of the connector 122). The first extension member 124A and the second extension member 124B are spaced apart from each other. The first piezo device 106A and the second piezo device 106B are aligned non-vertically relative to the horizon.

Referring to the embodiment as depicted in FIG. 3, the first base assembly 114 defines (provides) a first base mounting hole 115 (spaced apart mounting holes). A coupler device 126 is configured to be received in the first base mounting hole 115. A washer 128 is configured to receive the coupler device 126. The coupler device 126 is configured to affix the first base assembly 114 to a working surface.

Referring to the embodiment as depicted in FIG. 3, the first piezo device 106A and the second piezo device 106B are configured to be activated (by application of electricity thereto). Once activated, the first piezo device 106A and the second piezo device 106B impart a first vibration motion 118 to the first plate assembly 110A. The first vibration motion 118 is imparted via vibration energy made to travel from the first piezo device 106A and the second piezo device 106B along the first extension member 124A, the second extension member 124B and the first plate support 116 to the first plate assembly 110A.

Referring to the embodiment as depicted in FIG. 5, the first plate assembly 110A forms (provides) a first castellation formation 110B. The first castellation formation 110B extends along a length (a linear length) of one side of the first plate assembly 110A. The first castellation formation 110B may also be referred to as a set of spaced-apart teeth (extending members or extending portions that extend from the first plate assembly 110A).

The common parts-feeding path 120 is aligned along (on top of) the first castellation formation 110B. A first plate gap 110C extends between the formations (the extending teeth formations) of the first castellation formation 110B. A work piece 900 is placed or positioned on the first castellation formation 110B. Once the first piezo device 106A and the second piezo device 106B (depicted in FIG. 3) are activated, the work piece 900, in use, is urged to move (with the assistance of vibration energy) along a first travel direction 108.

The first vibratory parts-transferring assembly 102 has a first plate assembly 110A (meshable or toothed plate).

FIG. 6, FIG. 7 and FIG. 8 depict a side view (FIG. 6), a front view (FIG. 7) and a top view (FIG. 8) of embodiments of the work-piece feeding assembly 101 including the second vibratory parts-transferring assembly 202 of FIG. 2.

Referring to the embodiments as depicted in FIG. 6, FIG. 7 and FIG. 8, the work-piece feeding assembly 101 includes (and is not limited to) the second vibratory parts-transferring assembly 202. Preferably, the second vibratory parts-transferring assembly 202 includes the second vibration unit 204. Preferably, the second vibration unit 204 includes the first piezo mechanism 206A and the second piezo mechanism 206B (which are spaced apart from each other). The second guide rail 212 is affixed to the top surface (section) of the second plate assembly 210A. The second plate assembly 210A is affixed to the second plate support 216. The second base assembly 214 is spaced apart from the second plate support 216. A first base portion 217A extends upwardly from the second base assembly 214. A second base portion 217B extends from the second base assembly 214.

The first base portion 217A is spaced apart from the second base portion 217B. One end of the first piezo mechanism 206A is affixed to the first base portion 217A (by way of the connector 122). One end of the second piezo mechanism 206B is affixed to the second base portion 217B (by way of the connector 122). The opposite end of the first piezo mechanism 206A is affixed to the first extension member 124A (by way of the connector 122). The opposite end of the second piezo device 106B is affixed to the second extension member 124B (by way of the connector 122). The first extension member 124A is affixed to an end portion of the second plate support 216 (by way of the connector 122). The second extension member 124B is affixed to an opposite end portion of the second plate support 216 (by way of the connector 122). The first extension member 124A and the second extension member 124B are spaced apart from each other. The first piezo device 106A and the second piezo device 106B are aligned non-vertically relative to the horizon.

Referring to the embodiment as depicted in FIG. 6, the second base assembly 214 defines (provides) a second base mounting hole 215 (spaced apart mounting holes). A coupler device 126 is configured to be received in the second base mounting hole 215.

A washer 128 is configured to receive the coupler device 126. The coupler device 126 is configured to affix the second base assembly 214 to a working surface.

Referring to the embodiment as depicted in FIG. 6, the first piezo mechanism 206A and the second piezo mechanism 206B are configured to be activated (by application of electricity thereto). Once activated, the first piezo mechanism 206A and the second piezo mechanism 206B, in use, impart a second vibration motion 218 to the second plate assembly 210A. The second vibration motion 218 is imparted via vibration energy made to travel from the first piezo mechanism 206A and the second piezo mechanism 206B along the first extension member 124A, the second extension member 124B and the second plate support 216 to the second plate assembly 210A.

Referring to the embodiment as depicted in FIG. 8, the second plate assembly 210A forms (provides) a second castellation formation 210B. The second castellation formation 210B extends along a length (a linear length) of one side of the second plate assembly 210A. The second castellation formation 210B may also be referred to as a set of spaced-apart teeth (extending members or extending portions that extend from the second plate assembly 210A). The common parts-feeding path 120 is aligned along (on top of) the second castellation formation 210B. A second plate gap 210C extends between the formations (the extending teeth formations) of the second castellation formation 210B. A work piece 900 is placed or positioned on the second castellation formation 210B. Once the first piezo mechanism 206A and the second piezo mechanism 206B (depicted in FIG. 6) are activated, the work piece 900, in use, is urged to move (with the assistance of vibration energy) along a second travel direction 208. The second travel direction 208 is aligned opposite to the first travel direction 108 (depicted in FIG. 5). The second vibratory parts-transferring assembly 202 has the second plate assembly 210A (meshable or toothed plate).

FIG. 9, FIG. 10 and FIG. 11 depict a side view (FIG. 9), a front view (FIG. 10) and a top view (FIG. 11) of embodiments of the work-piece feeding assembly 101 of FIG. 2.

Referring to the embodiments as depicted in FIG. 9, FIG. 10 and FIG. 11, the first vibratory parts-transferring assembly 102 and the second vibratory parts-transferring assembly 202 are positioned in a side-by-side relationship (arrangement), with the second vibratory parts-transferring assembly 202 positioned along a side (lateral side) of the first vibratory parts-transferring assembly 102. The second vibratory parts-transferring assembly 202 is positioned in front of the first vibratory parts-transferring assembly 102.

Referring to the embodiment as depicted in FIG. 11, the first castellation formation 110B and the second castellation formation 210B are positioned to interlace (mesh) with each other. This is done once the first vibratory parts-transferring assembly 102 and the second vibratory parts-transferring assembly 202 are positioned in a side-by-side relationship (arrangement). The common parts-feeding path 120 is aligned along (over) the overlapping sections of the first castellation formation 110B and the second castellation formation 210B.

Referring to the embodiment as depicted in FIG. 11, the common parts-feeding path 120 may be referred to as a riding surface or a common lane or a shared lane, and any equivalent thereof. The common parts-feeding path 120 is aligned along the first castellation formation 110B and the second castellation formation 210B. The first guide rail 112 and the second guide rail 212 are spaced apart. The first guide rail 112 and the second guide rail 212 are positioned adjacent to the first castellation formation 110B and the second castellation formation 210B. The first castellation formation 110B and the second castellation formation 210B are positioned between the first guide rail 112 and the second guide rail 212. In accordance with an option, the work piece 900 has a flat bottom that, in use, rides on the surface of the first castellation formation 110B and the second castellation formation 210B. In accordance with another option, the work piece 900 include a connector (such as a screw, a bolt, etc.), and the work piece 900 is fed by hanging the work piece 900 from (the edges or) the first guide rail 112 and the second guide rail 212 (if so desired).

For instance, the work piece 900 includes an electronics element (electronic chip element), such as a resistor, a capacitor, etc., having a rectilinear shape (rectangular shape). Referring to the embodiment as depicted in FIG. 11, the first vibratory parts-transferring assembly 102 has the first plate assembly 110A (also referred to as a meshable plate or a toothed plate). The second vibratory parts-transferring assembly 202 has the second plate assembly 210A (also referred to as a meshable plate or a toothed plate. The first plate assembly 110A and the second plate assembly 210A are meshable and/or interlacable with each other. The first plate assembly 110A and the second plate assembly 210A are configured to mesh and/or interlace with each other (together). The first plate assembly 110A and the second plate assembly 210A can be meshed and/or interlaced with each other (together).

The definition of interlacable is to cross or be crossed intricately together, to interweave, mingle or intersperse something with. The teeth or the extended portions of the first castellation formation 110B and the second castellation formation 210B are configured to (in use) interlace with each other. The definition of meshable is the same as definition of interlacable.

Referring to the embodiment as depicted in FIG. 11, the first vibratory parts-transferring assembly 102 and the second vibratory parts-transferring assembly 202 are configured to be positioned adjacent, at least in part, to each other, and form a gap there between (that is, a gap is formed between the first castellation formation 110B and the second castellation formation 210B). The first vibratory parts-transferring assembly 102 and the second vibratory parts-transferring assembly 202 have (define) the common parts-feeding path 120 once the first vibratory parts-transferring assembly 102 and the second vibratory parts-transferring assembly 202, in use, are positioned, at least in part, next to each other in a side-by-side arrangement.

Figure 12:
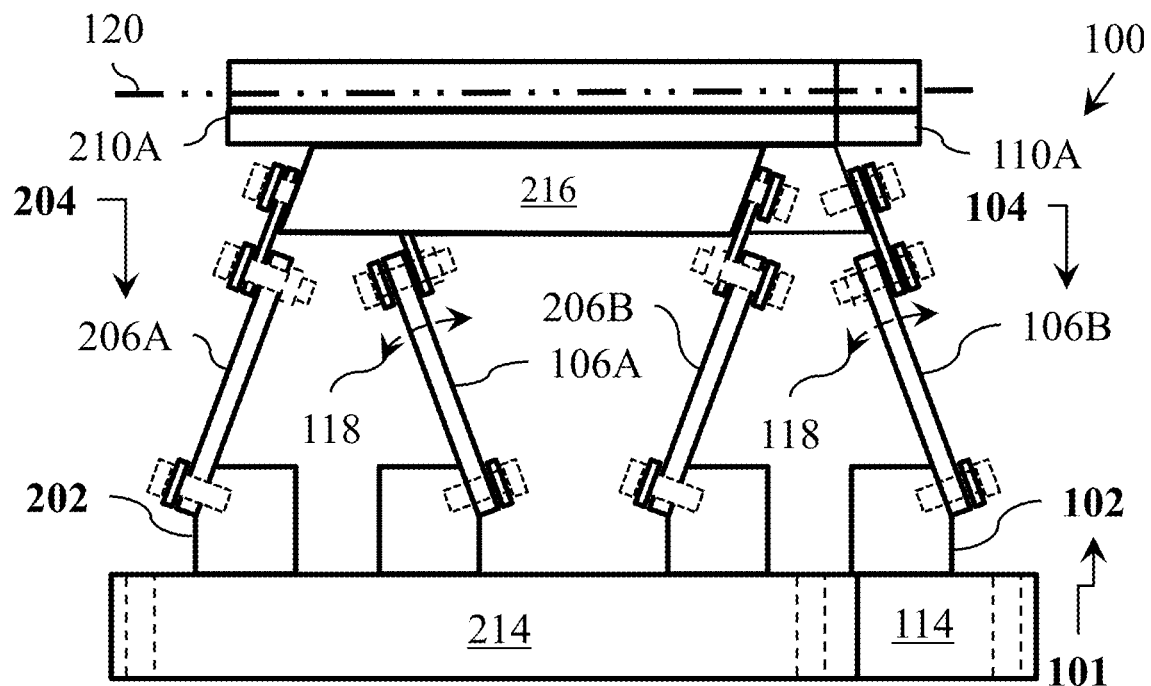
FIG. 12 and FIG. 13 depict a side view (FIG. 12) and a top view (FIG. 13) of embodiments of the work-piece feeding assembly of FIG. 2.
Figure 13:
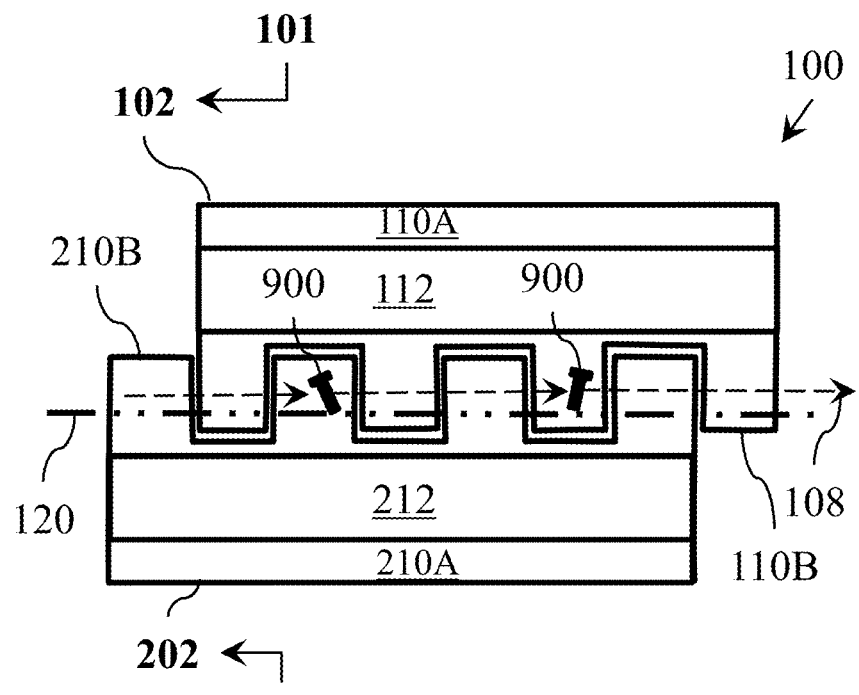

FIG. 12 and FIG. 13 depict a side view (FIG. 12) and a top view (FIG. 13) of embodiments of the work-piece feeding assembly 101 of FIG. 2 (in which the first vibratory parts-transferring assembly 102 is selectively activated and in which the second vibratory parts-transferring assembly 202 is selectively deactivated).

Referring to the embodiments as depicted in FIG. 12 and FIG. 13, the first vibration unit 104 is activated (along the first vibration motion 118). The second vibration unit 204 is deactivated. FIG. 12 depicts a first operation mode of the apparatus 100. Once the first vibratory parts-transferring assembly 102 is made to vibrate (while the second vibratory parts-transferring assembly 202 is deactivated), the work piece 900 is urged to travel (move) along a first predetermined direction (that is, along the first travel direction 108 as depicted in FIG. 13). For the case where the first vibratory parts-transferring assembly 102, in use, vibrates and the second vibratory parts-transferring assembly 202 is not vibrated (is not made to be vibrated), the work piece 900 is urged to move along the first travel direction 108.

Referring to the embodiment as depicted in FIG. 13, once the first vibratory parts-transferring assembly 102 is made to vibrate, the first plate assembly 110A and the second plate assembly 210A, preferably, do not touch (contact) each other. The first guide rail 112 and the second guide rail 212 are configured to guide the direction of the work piece 900. This is done once the first vibration unit 104 is activated.

Figure 15:
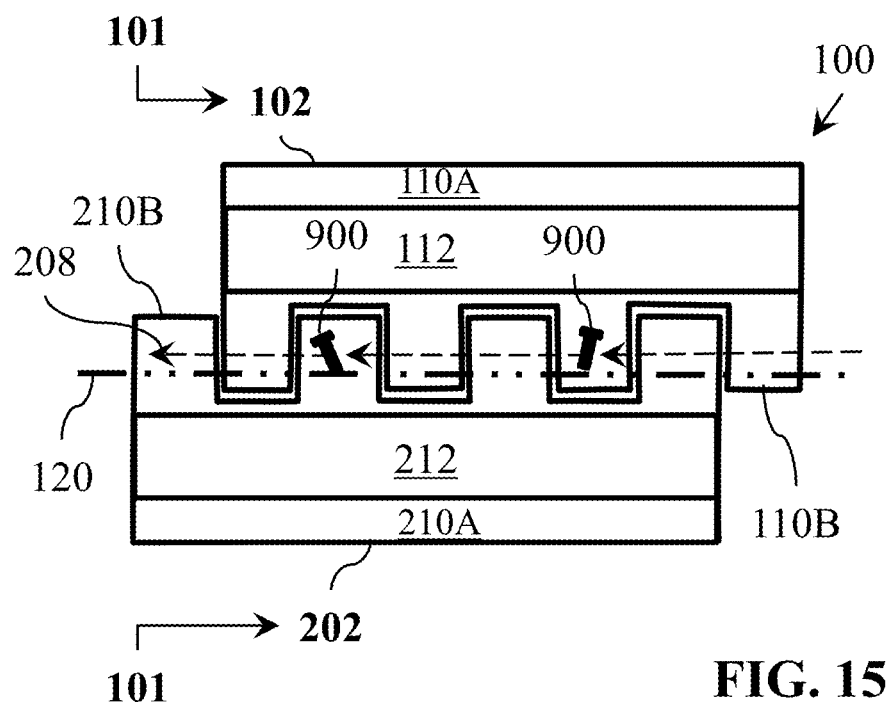

Referring to the embodiments as depicted in FIG. 13 and FIG. 15, the first vibratory parts-transferring assembly 102 and the second vibratory parts-transferring assembly 202 are configured to operate in opposite directions, and be positioned side by side (in a side-by-side relationship or arrangement).

Figure 14:
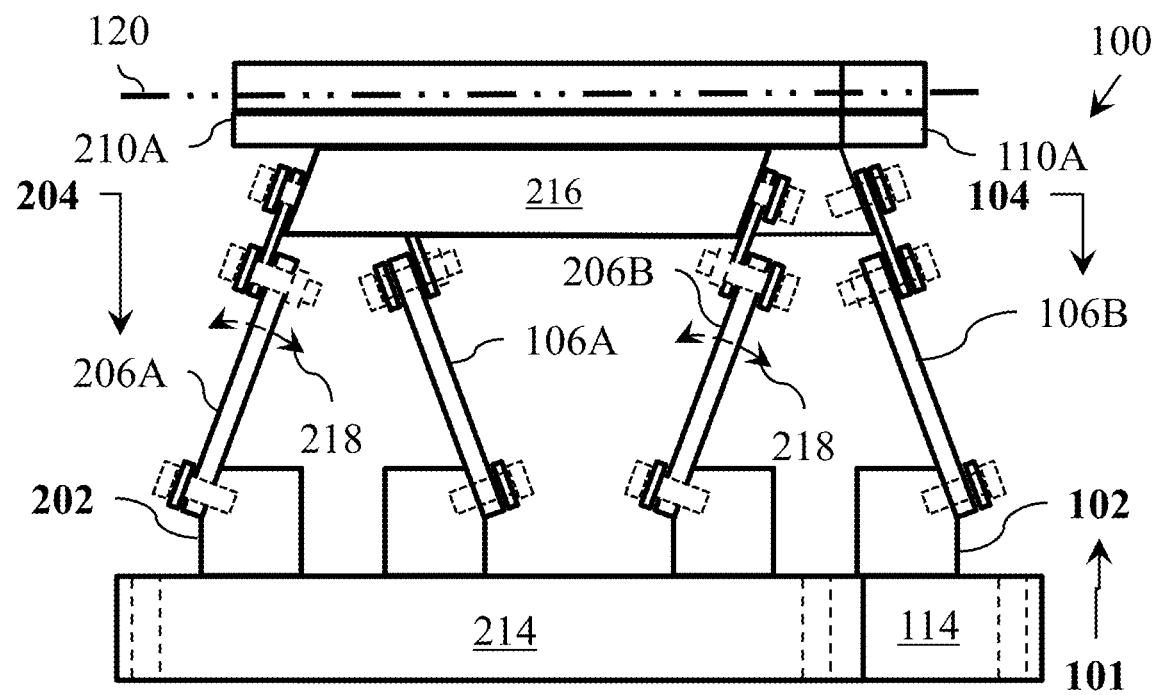
FIG. 14 and FIG. 15 depict a side view (FIG. 14) and a top view (FIG. 15) of embodiments of the work-piece feeding assembly of FIG. 2.

FIG. 14 and FIG. 15 depict a side view (FIG. 14) and a top view (FIG. 15) of embodiments of the work-piece feeding assembly 101 of FIG. 2 (in which the first vibratory parts-transferring assembly 102 is selectively deactivated, and in which the second vibratory parts-transferring assembly 202 is selectively activated).

Figure 16:
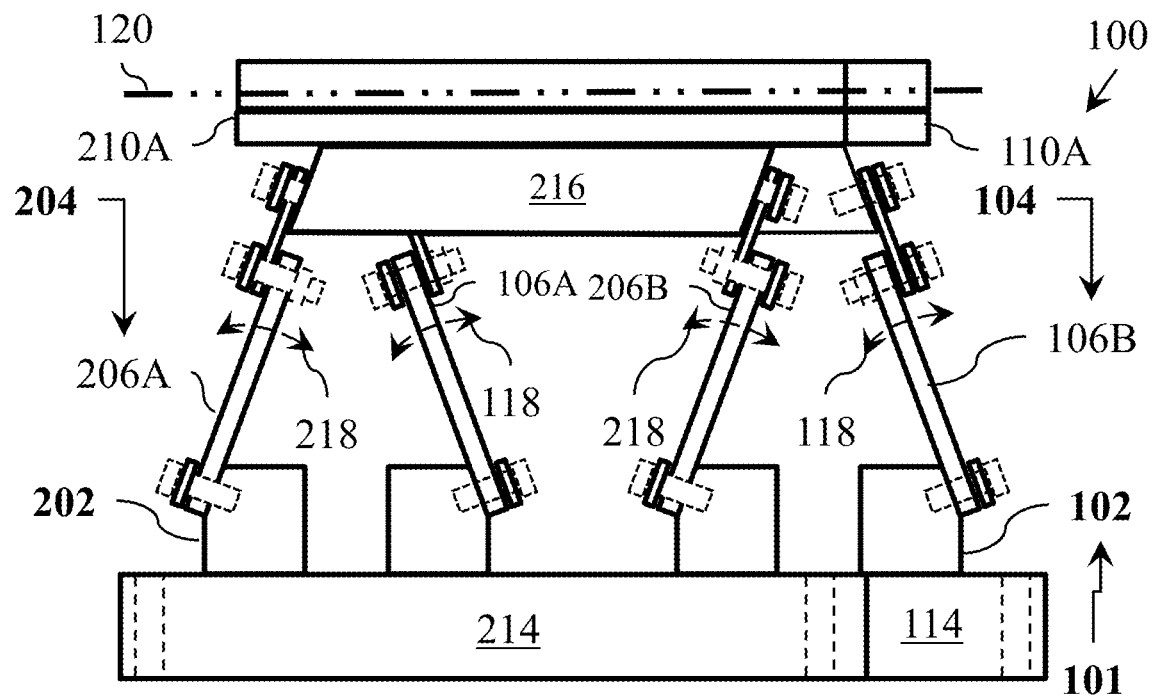
FIG. 16 and FIG. 17 depict a side view (FIG. 16) and a top view (FIG. 17) of embodiments of the work-piece feeding assembly of FIG. 2.
Figure 17:
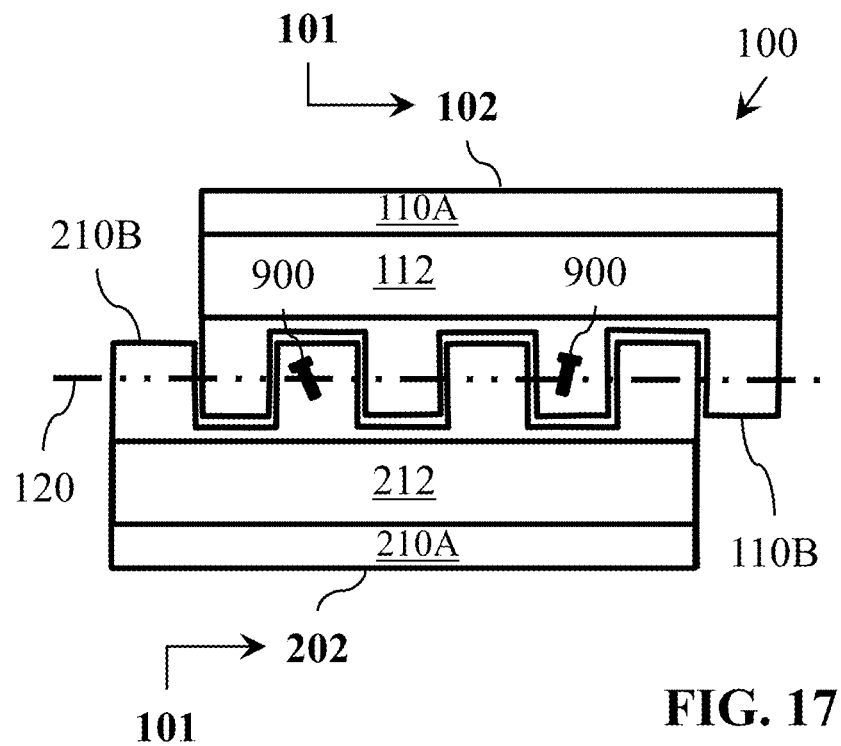

FIG. 16 and FIG. 17 depict a side view (FIG. 16) and a top view (FIG. 17) of embodiments of the work-piece feeding assembly 101 of FIG. 2 (in which the first vibratory parts-transferring assembly 102 is selectively activated and in which the second vibratory parts-transferring assembly 202 is selectively activated).

Referring to the embodiments as depicted in FIG. 14 and FIG. 15, the first vibration unit 104 is deactivated. The second vibration unit 204 is activated (along the second vibration motion 218). FIG. 14 depicts a second operation mode of the apparatus 100. Once the first vibratory parts-transferring assembly 102 is deactivated (while the second vibratory parts-transferring assembly 202 is activated), the work piece 900 is urged to travel (move) along a second predetermined direction (that is, along the second travel direction 208 as depicted in FIG. 15). For the case where the first vibratory parts-transferring assembly 102, in use, is deactivated and the second vibratory parts-transferring assembly 202 is activated (to vibrate), the work piece 900 is urged to move along the second travel direction 208.

Referring to the embodiment as depicted in FIG. 14 and FIG. 15, for the case where the work piece 900 is prevented (or becomes jammed and prevented) from travelling along the second vibration motion 218 (via the common parts-feeding path 120), the second vibration unit 204 is deactivated (the first piezo mechanism 206A and the second piezo mechanism 206B are deactivated), and the first vibration unit 104 is activated (temporarily activated) (the first piezo device 106A and the second piezo device 106B are activated). After a relatively short time, the work piece 900 may become unjammed, and in this case the second vibration unit 204 is reactivated (the first piezo mechanism 206A and the second piezo mechanism 206B are reactivated), and the first vibration unit 104 is deactivated (the first piezo device 106A and the second piezo device 106B are reactivated). This mode of operation is utilized to clear the work piece 900 when the work piece 900 becomes jammed (prevented from moving along a desired direction via the common parts-feeding path 120).

Generally, the second vibration unit 204 is configured to be deactivated and the first vibration unit 104 is configured to be activated once the work piece 900, in use, becomes jammed and is prevented from travelling along the second vibration motion 218 via the common parts-feeding path 120. The second vibration unit 204 is configured to be activated and the first vibration unit 104 is deactivated once the work piece 900 becomes unjammed, so that the work piece 900 is permitted to travel along the second vibration motion 218 via the common parts-feeding path 120.

Referring to the embodiment as depicted in FIG. 15, once the second vibratory parts-transferring assembly 202 is activated (vibrated), the first plate assembly 110A and the second plate assembly 210A, preferably, do not touch (contact) each other. The first guide rail 112 and the second guide rail 212 are configured to guide the direction of the work piece 900. This is done once the first vibration unit 104 is activated.

Referring to the embodiments as depicted in FIG. 13 and FIG. 15, the first vibratory parts-transferring assembly 102 and the second vibratory parts-transferring assembly 202 are configured to operate in opposite directions, and be positioned side by side. Once the second vibratory parts-transferring assembly 202 is made to vibrate, the first plate assembly 110A and the second plate assembly 210A do not touch (contact) each other.

Referring to the embodiments as depicted in FIG. 16 and FIG. 17, the first vibration unit 104 is activated, and the second vibration unit 204 is activated. FIG. 16 depicts a third operation mode of the apparatus 100. Once the first vibratory parts-transferring assembly 102 and the second vibratory parts-transferring assembly 202 are made to vibrate in unison (preferably at the same time or at approximately at the same time), the work piece 900 may vibrate but the work piece 900 is not urged to move progressively along either the first predetermined direction or the second predetermined direction (or any net movement direction). It will be appreciated that the third operation mode, in use, reduces the pack pressure to the work pieces 900 for the case where the work pieces 900 become jammed and cannot move along either the first predetermined direction or the second predetermined direction (or any net direction).

Referring to the embodiment as depicted in FIG. 17, once the first vibratory parts-transferring assembly 102 and the second vibratory parts-transferring assembly 202 are activated (vibrated in unison), the first plate assembly 110A and the second plate assembly 210A, preferably, do not touch (contact) each other.

Referring to the embodiments as depicted in FIG. 14, FIG. 15, FIG. 16 and FIG. 17, and in accordance with a major embodiment, the apparatus 100 includes and is not limited to (comprises) a work-piece feeding assembly 101. The work-piece feeding assembly 101 may be called a parts-supplying assembly, etc., and any equivalent thereof. The work-piece feeding assembly 101 includes and is not limited to (comprises) a first vibratory parts-transferring assembly 102. The first vibratory parts-transferring assembly 102 may be called (include) a first vibratory linear-transferring assembly, etc., and any equivalent thereof. The work-piece feeding assembly 101 also includes and is not limited to (comprises) a second vibratory parts-transferring assembly 202. The second vibratory parts-transferring assembly 202 may be called (include) a second vibratory linear-transferring assembly, and any equivalent thereof. The first vibratory parts-transferring assembly 102 is for transferring (feeding) a work piece 900 (also called a work part or part) along a first travel direction 108 via a common parts-feeding path 120. The first vibratory parts-transferring assembly 102 is configured to transfer the work piece 900 along the first travel direction 108. The second vibratory parts-transferring assembly 202 is for transferring (feeding) the work piece 900 along a second travel direction 208 via the common parts-feeding path 120. The second vibratory parts-transferring assembly 202 is configured to transfer the work piece 900 along the second travel direction 208.

Referring to the embodiments as depicted in FIG. 14, FIG. 15, FIG. 16 and FIG. 17, and in accordance with a major embodiment, the apparatus 100 includes and is not limited to (comprises) a work-piece feeding assembly 101. The work-piece feeding assembly 101 may be called a parts-supplying assembly, and any equivalent thereof. The work-piece feeding assembly 101 includes and is not limited to (comprises) a first vibratory parts-transferring assembly 102 configured to be selectively vibrated. The work-piece feeding assembly 101 also includes and is not limited to (comprises) a second vibratory parts-transferring assembly 202 configured to be selectively vibrated. The first vibratory parts-transferring assembly 102 and the second vibratory parts-transferring assembly 202 have (define) a common parts-feeding path 120. The first vibratory parts-transferring assembly 102 is configured to selectively transfer (feed) a work piece 900 along a first travel direction 108 via the common parts-feeding path 120 in response to selective activation of the first vibratory parts-transferring assembly 102, and in response to selective deactivation of the second vibratory parts-transferring assembly 202. The second vibratory parts-transferring assembly 202 is configured to selectively transfer (feed) the work piece 900 along a second travel direction 208 via the common parts-feeding path 120 in response to selective activation of the second vibratory parts-transferring assembly 202, and in response to selective deactivation of the first vibratory parts-transferring assembly 102. The first travel direction 108 and the second travel direction 208 are opposite to each other, and are aligned along the common parts-feeding path 120.

Referring to the embodiments as depicted in FIG. 14, FIG. 15, FIG. 16 and FIG. 17, and in accordance with a major embodiment, the apparatus 100 includes and is not limited to (comprises) a work-piece feeding assembly 101. The work-piece feeding assembly 101 may be called a parts-supplying assembly, and any equivalent thereof. The work-piece feeding assembly 101 includes and is not limited to (comprises) a first vibratory parts-transferring assembly 102 having a first vibration unit 104. The first vibration unit 104 is configured to be selectively activated; this is done in such a way that the first vibration unit 104, in use, selectively vibrates the first vibratory parts-transferring assembly 102; this is done once the first vibration unit 104, in use, is selectively activated. The work-piece feeding assembly 101 also includes and is not limited to (comprises) a second vibratory parts-transferring assembly 202 having a second vibration unit 204. The second vibration unit 204 is configured to be selectively activated; this is done in such a way that the second vibratory parts-transferring assembly 202, in use, selectively vibrates the second vibratory parts-transferring assembly 202; this is done once the second vibration unit 204, in use, is selectively activated. The first vibratory parts-transferring assembly 102 and the second vibratory parts-transferring assembly 202 have (define) a common parts-feeding path 120. The first vibratory parts-transferring assembly 102 is configured to selectively transfer (feed) a work piece 900 along a first travel direction 108 via the common parts-feeding path 120 in response to selective activation of the first vibration unit 104, and in response to selective deactivation of the second vibration unit 204. The second vibratory parts-transferring assembly 202 is configured to selectively transfer (feed) the work piece 900 along a second travel direction 208 via the common parts-feeding path 120 in response to selective activation of the second vibration unit 204, and in response to selective deactivation of the first vibration unit 104. The first travel direction 108 and the second travel direction 208 are opposite to each other, and are aligned along the common parts-feeding path 120.

Referring to the embodiments as depicted in FIG. 14, FIG. 15, FIG. 16 and FIG. 17, and in accordance with a major embodiment, the apparatus 100 includes and is not limited to (comprises) a work-piece feeding assembly 101 having a common parts-feeding path 120 configured to receive a work piece 900 to be moved along the common parts-feeding path 120. The work-piece feeding assembly 101 is configured to select between a first vibration motion and a second vibration motion once the work piece 900 becomes jammed while attempting to travel along the common parts-feeding path 120. The first vibration motion is utilized to urge movement of the work piece 900 along a first travel direction 108 via the common parts-feeding path 120. The second vibration motion is utilized to urge movement of the work piece 900 along a second travel direction 208 via the common parts-feeding path 120.

Referring to the embodiments as depicted in FIG. 14, FIG. 15, FIG. 16 and FIG. 17, and in accordance with a major embodiment, a method is for operating an apparatus 100 including a work-piece feeding assembly 101 having a common parts-feeding path 120 configured to receive a work piece 900 to be moved along the common parts-feeding path 120. The method includes (and is not limited to) selecting between a first vibration motion and a second vibration motion once the work piece 900 becomes jammed while attempting to travel along the common parts-feeding path 120. The first vibration motion is utilized to urge movement of the work piece 900 along a first travel direction 108 via the common parts-feeding path 120. The second vibration motion is utilized to urge movement of the work piece 900 along a second travel direction 208 via the common parts-feeding path 120.

Referring to the embodiments as depicted in FIG. 14, FIG. 15, FIG. 16 and FIG. 17, and in accordance with a major embodiment, the apparatus 100 includes and is not limited to (comprises) an apparatus 100 including a work-piece feeding assembly 101 configured to (A) selectively transfer, by way of a first vibration motion, a work piece 900 along a first travel direction 108 via a common parts-feeding path 120, and (B) selectively transfer, by way of a second vibration motion, the work piece 900 along a second travel direction 208 via the common parts-feeding path 120; this is done once the work piece 900 becomes jammed while attempting to travel along the common parts-feeding path 120.

Figure 18:
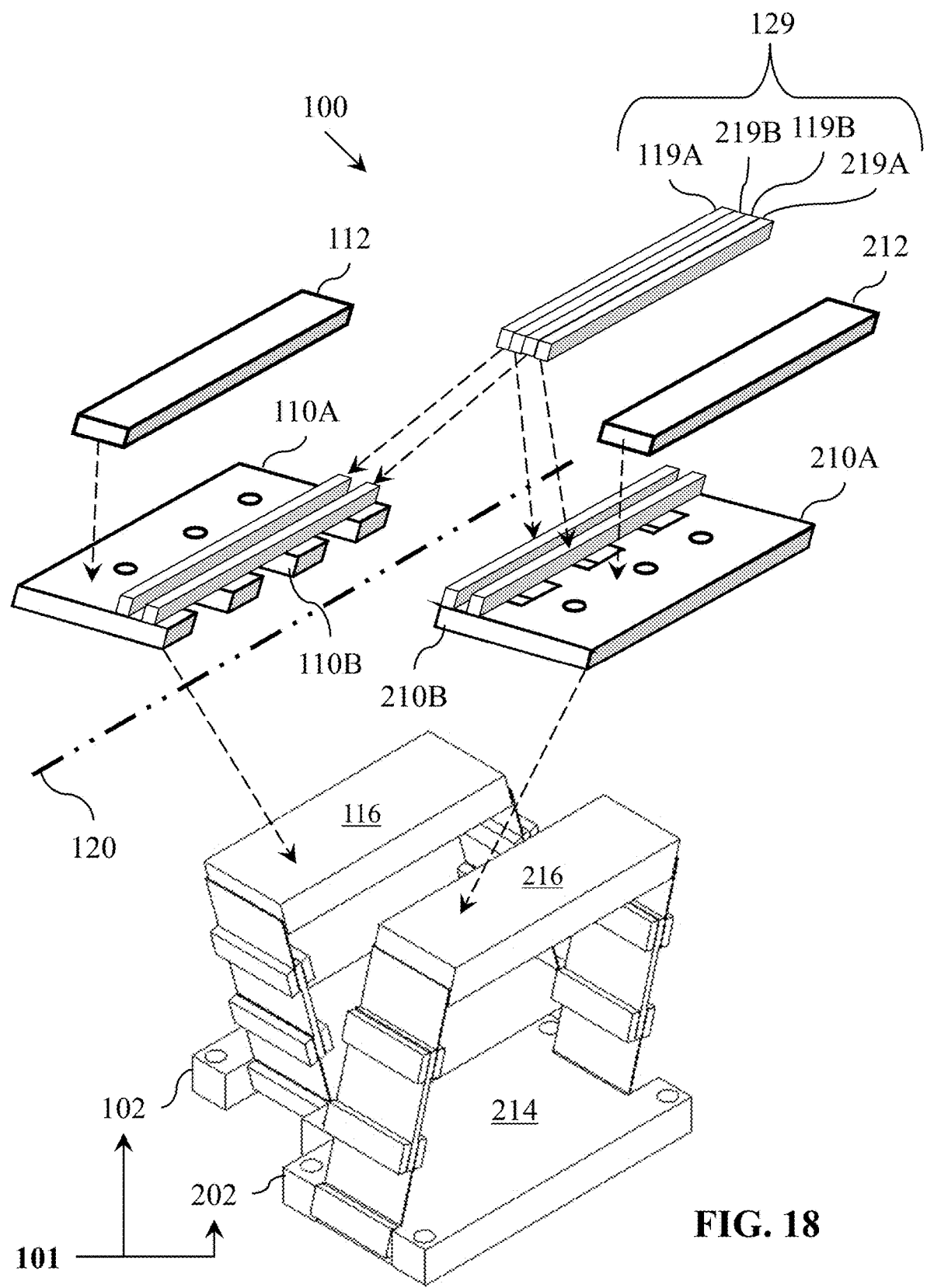
FIG. 18 depicts a perspective view of an embodiment of the work-piece feeding assembly of FIG. 1.

FIG. 18 depicts a perspective view of an embodiment of the work-piece feeding assembly 101 of FIG. 1.

Referring to the embodiment as depicted in FIG. 18, the apparatus 100 further includes (and is not limited to) a cover assembly 129. The cover assembly 129 is configured to cover, at least in part, the first castellation formation 110B (of the first plate assembly 110A) and the second castellation formation 210B (of the second plate assembly 210A). The cover assembly 129 is positioned between the first guide rail 112 and the second guide rail 212. The first plate assembly 110A is configured to be affixed to the top section of the first plate support 116. The second plate assembly 210A is configured to be affixed to the top section of the second plate support 216.

Referring to the embodiment as depicted in FIG. 18, the cover assembly 129 includes a first plate cover portion 119A (also called a first elongated cover or a first elongated rail). The first plate cover portion 119A is configured to be affixed to the first castellation formation 110B of the first plate assembly 110A.

Referring to the embodiment as depicted in FIG. 18, the cover assembly 129 includes a second plate cover portion 119B (also called a second elongated cover or a second elongated rail). The second plate cover portion 119B is configured to be affixed to the first castellation formation 110B of the first plate assembly 110A.

Referring to the embodiment as depicted in FIG. 18, the cover assembly 129 includes a third plate cover portion 219A (also called a third elongated cover or a third elongated rail). The third plate cover portion 219A is configured to be affixed to the second castellation formation 210B of the second plate assembly 210A.

Referring to the embodiment as depicted in FIG. 18, the cover assembly 129 includes a fourth plate cover portion 219B (also called a fourth elongated cover or a fourth elongated rail). The fourth plate cover portion 219B is configured to be affixed to the second castellation formation 210B of the second plate assembly 210A.

Referring to the embodiment as depicted in FIG. 18, the first plate cover portion 119A is spaced apart from the second plate cover portion 119B. The third plate cover portion 219A is spaced apart from the fourth plate cover portion 219B. The fourth plate cover portion 219B is positioned between the first plate cover portion 119A and the second plate cover portion 119B. The second plate cover portion 119B is positioned between the third plate cover portion 219A and the fourth plate cover portion 219B. The first plate cover portion 119A, the second plate cover portion 119B, the third plate cover portion 219A, and the fourth plate cover portion 219B are positioned in alternating arrangement with respect to each other. Preferably, the third plate cover portion 219A, the fourth plate cover portion 219B, the first plate cover portion 119A and the second plate cover portion 119B each have a square-shaped cross-sectional profile.

Figure 19:
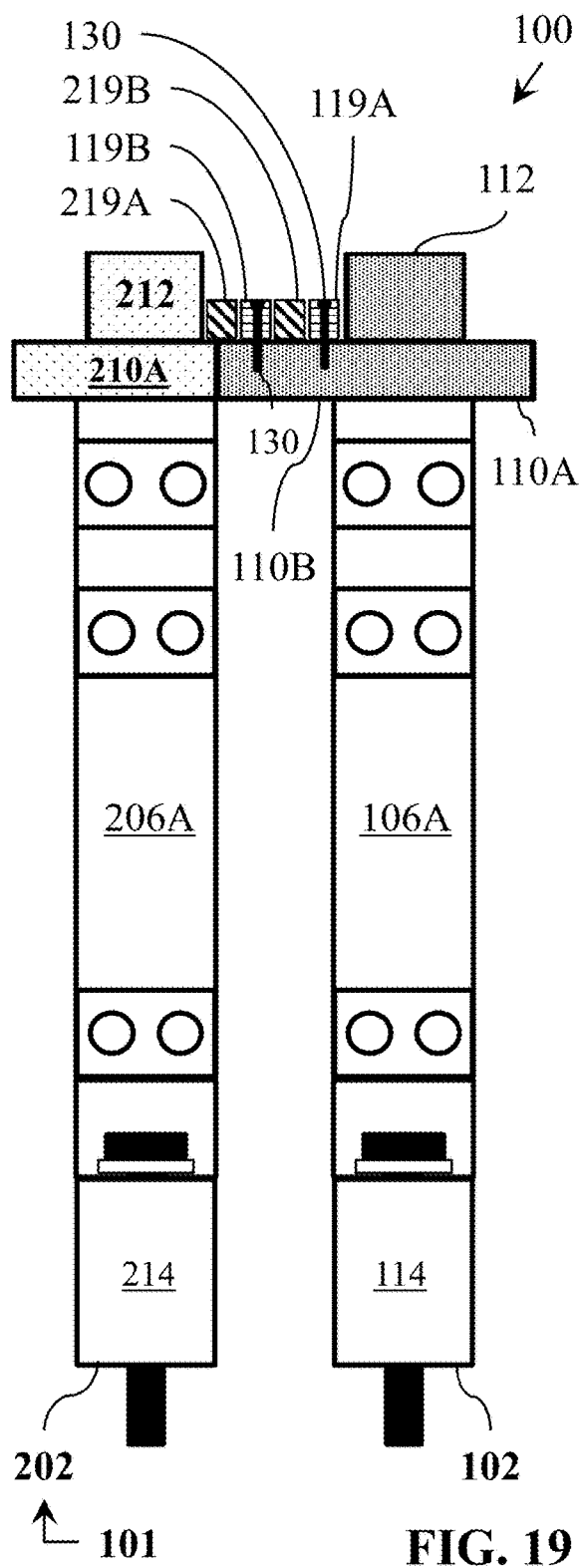
FIG. 19 and FIG. 20 depict front views of embodiments of the work-piece feeding assembly of FIG. 18.
Figure 20:
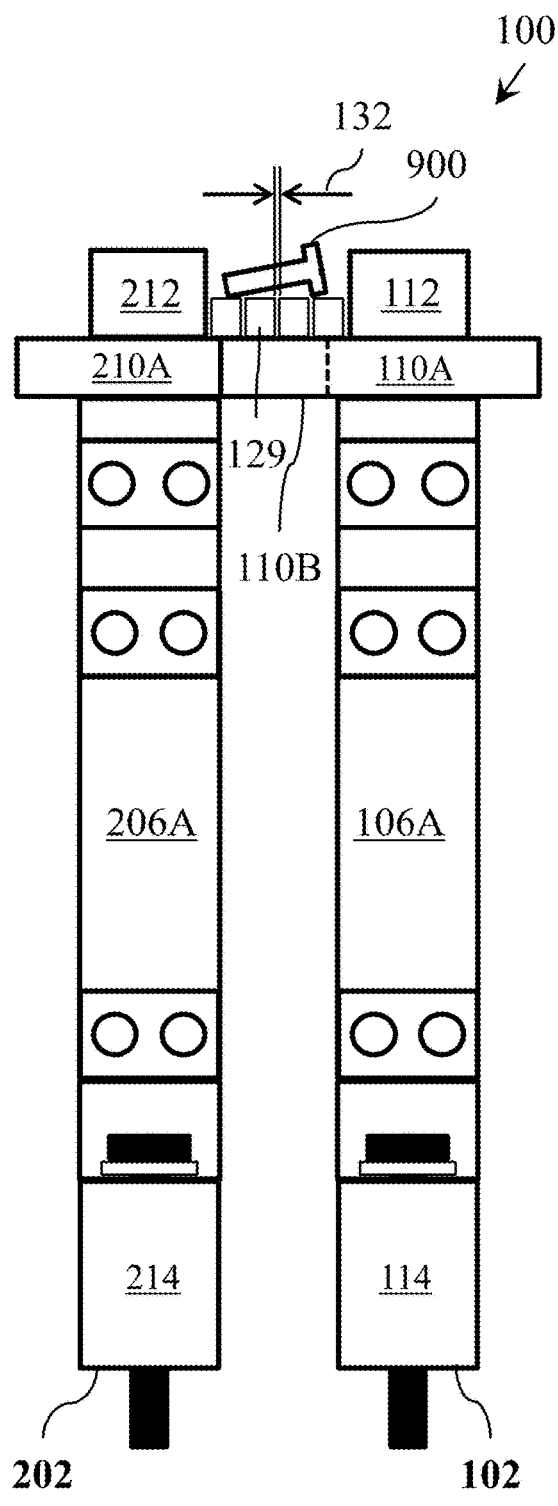

FIG. 19 and FIG. 20 depict front views of embodiments of the work-piece feeding assembly 101 of FIG. 18.

Referring to the embodiment as depicted in FIG. 19, the cover connector 130 connects (securely connects) the first plate cover portion 119A to the first castellation formation 110B of the first plate assembly 110A. The cover connector 130 connects (securely connects) the second plate cover portion 119B to the first castellation formation 110B of the first plate assembly 110A.

Referring to the embodiment as depicted in FIG. 20, the work piece 900 is positioned on the cover assembly 129. A cover gap 132 is formed (positioned) between each of the rails of the cover assembly 129. In accordance with an option, the cover gap 132 is formed between is formed (positioned) between the rails of the cover assembly 129 and the first guide rail 112 and the second guide rail 212.

Figure 21:
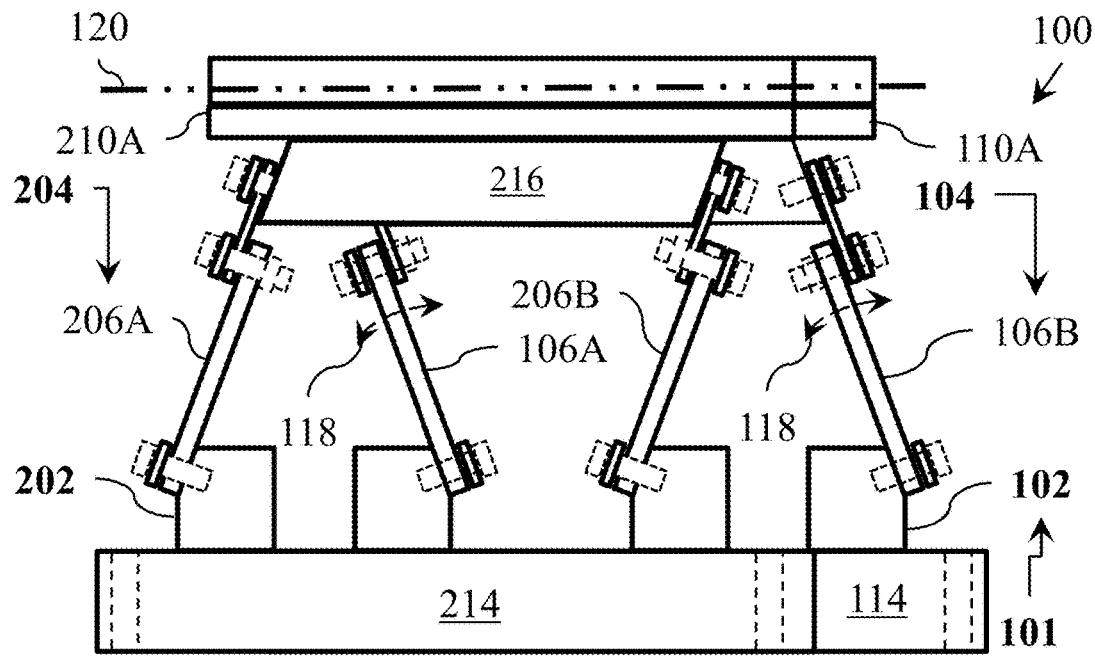
FIG. 21 and FIG. 22 depict a side view (FIG. 21) and a top view (FIG. 22) of embodiments of the work-piece feeding assembly of FIG. 18.
Figure 22:
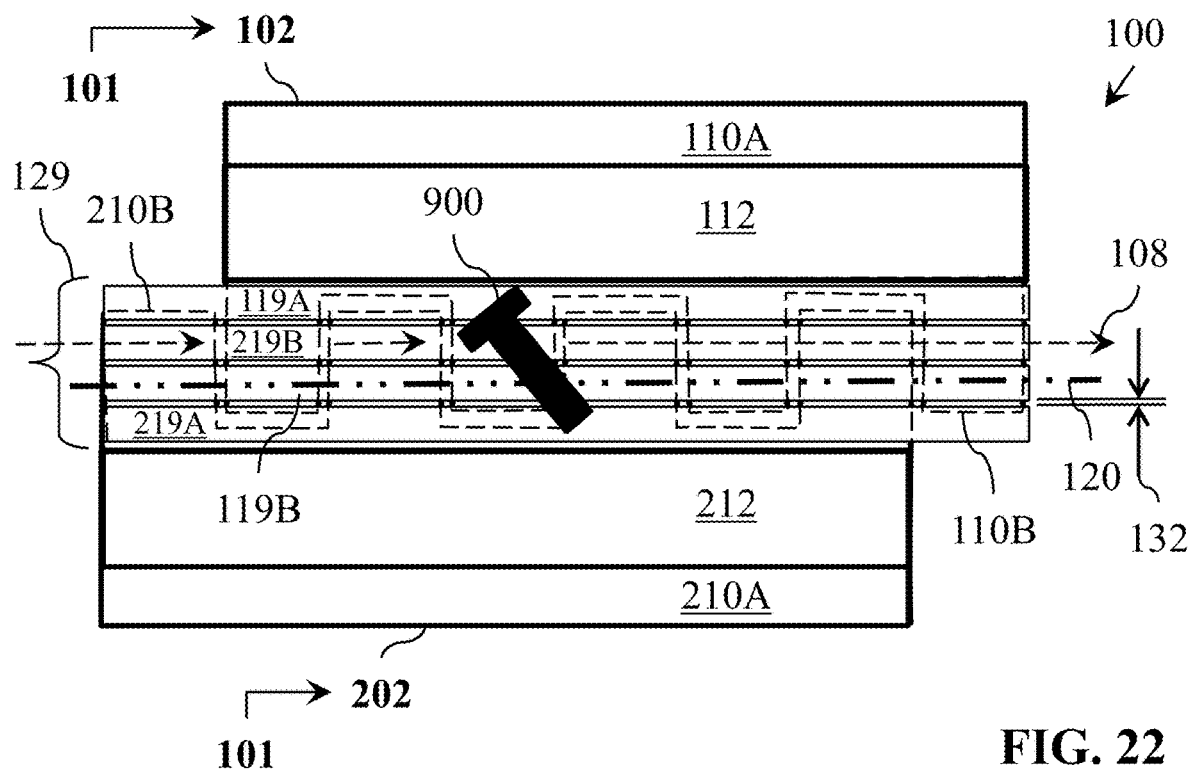

FIG. 21 and FIG. 22 depict a side view (FIG. 21) and a top view (FIG. 22) of embodiments of the work-piece feeding assembly 101 of FIG. 18 (in which the first vibratory parts-transferring assembly 102 is selective deactivated and in which the second vibratory parts-transferring assembly 202 is selectively activated).

Referring to the embodiment as depicted in FIG. 21, the first vibration unit 104 is activated (the first piezo device 106A and the second piezo device 106B are activated or energized). Activation of the first vibration unit 104 may result in the first vibration motion 118 (motion or vibration motion). The first plate cover portion 119A and the second plate cover portion 119B receive vibration energy from the first vibration unit 104 (in response to activation of the first vibration unit 104).

Referring to the embodiment as depicted in FIG. 21, the second vibration unit 204 is deactivated (the first piezo mechanism 206A and the second piezo mechanism 206B are deactivated or de-energized). The third plate cover portion 219A and the fourth plate cover portion 219B receive no vibration energy from the second vibration unit 204. The third plate cover portion 219A and the fourth plate cover portion 219B receive no vibration energy from the first vibration unit 104 (the reason is that there is a gap between the elongated rails of the cover assembly 129, and there is a gap between the first castellation formation 110B and the second castellation formation 210B, and therefore vibration energy cannot travel or does not travel from the first vibration unit 104, which is activated, to the third plate cover portion 219A and the fourth plate cover portion 219B).

Referring to the embodiment as depicted in FIG. 22, the work piece 900 contacts, in use, the first plate cover portion 119A and the second plate cover portion 119B. In response to energization (activation) of the first vibration unit 104 (as depicted in FIG. 21), the work piece 900 is urged to move along the first travel direction 108 (via the common parts-feeding path 120), once the work piece 900 contacts, in use, the first plate cover portion 119A and the second plate cover portion 119B.

Figure 23:
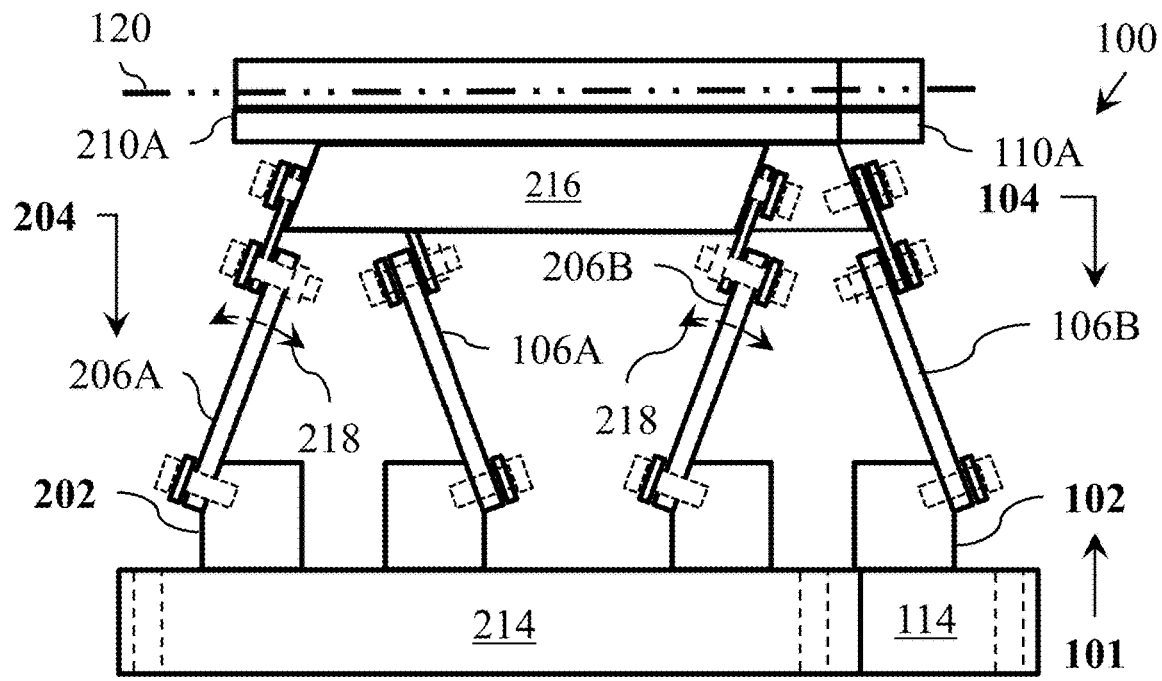
FIG. 23 and FIG. 24 depict a side view (FIG. 23) and a top view (FIG. 24) of embodiments of the work-piece feeding assembly of FIG. 18.
Figure 24:
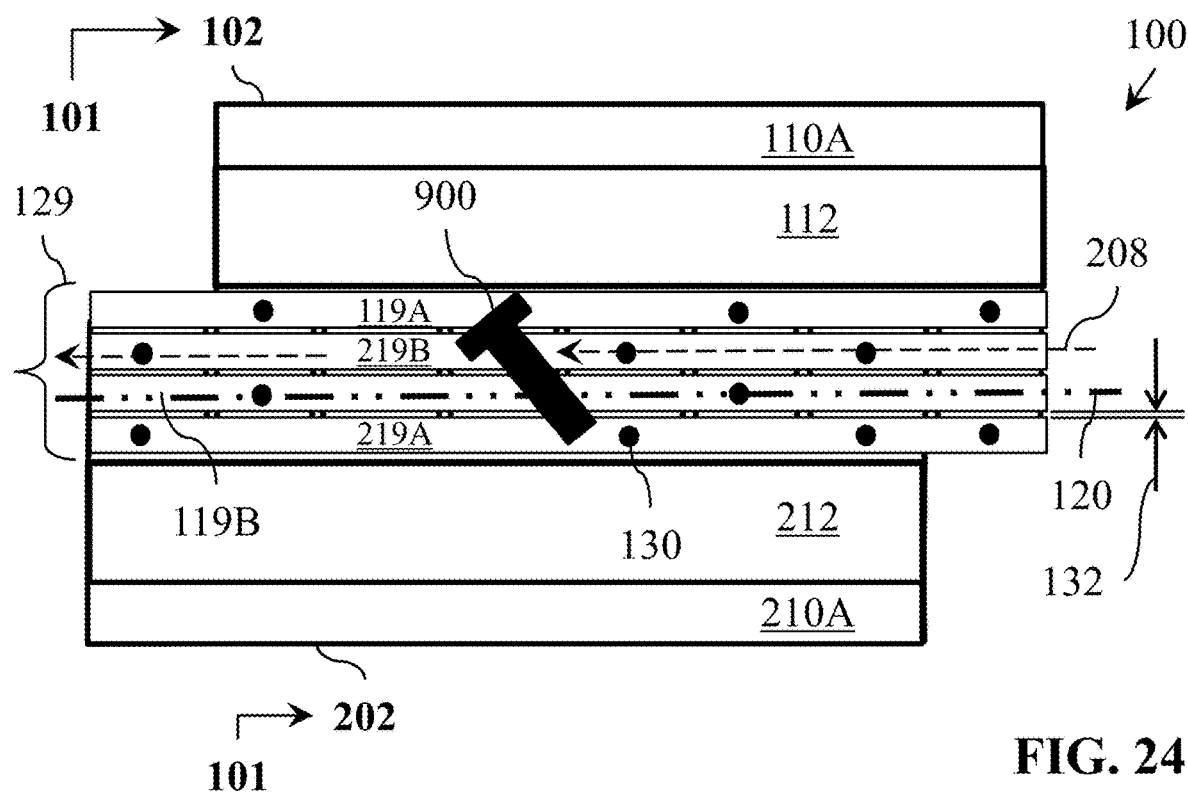

FIG. 23 and FIG. 24 depict a side view (FIG. 23) and a top view (FIG. 24) of embodiments of the work-piece feeding assembly 101 of FIG. 18 (in which the first vibratory parts-transferring assembly 102 is selectively deactivated and in which the second vibratory parts-transferring assembly 202 is selectively activated).

Referring to the embodiment as depicted in FIG. 23, the second vibration unit 204 is activated (the first piezo mechanism 206A and the second piezo mechanism 206B are activated or energized). Activation of the second vibration unit 204 results in the second vibration motion 218 (motion or vibration motion). The third plate cover portion 219A and the fourth plate cover portion 219B receive vibration energy from the second vibration unit 204 (in response to activation of the second vibration unit 204).

Referring to the embodiment as depicted in FIG. 21, the first vibration unit 104 is deactivated (the first piezo device 106A and the second piezo device 106B are deactivated or de-energized). The first plate cover portion 119A and the second plate cover portion 119B receive no vibration energy from the first vibration unit 104. The first plate cover portion 119A and the second plate cover portion 119B receive no vibration energy from the second vibration unit 204 (the reason is that there is a gap between the elongated rails of the cover assembly 129, and there is a gap between the first castellation formation 110B and the second castellation formation 210B, and therefore vibration energy cannot travel or does not travel from the second vibration unit 204, which is activated, to the first plate cover portion 119A and the second plate cover portion 119B).

Referring to the embodiment as depicted in FIG. 22, the work piece 900 contacts, in use, the third plate cover portion 219A and the fourth plate cover portion 219B. In response to energization (activation) of the second vibration unit 204 (as depicted in FIG. 23), the work piece 900 is urged to move along the second travel direction 208 (via the common parts-feeding path 120), once the work piece 900 contacts, in use, the third plate cover portion 219A and the fourth plate cover portion 219B.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as they do not materially change the operability of the invention. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the invention. The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
  a work-piece feeding assembly, including:
    a first vibratory parts-transferring assembly being configured to be selectively vibrated; and
    a second vibratory parts-transferring assembly being configured to be selectively vibrated; and
    the first vibratory parts-transferring assembly and the second vibratory parts-transferring assembly having a common parts-feeding path; and
    the first vibratory parts-transferring assembly being configured to selectively transfer a work piece along a first travel direction via the common parts-feeding path in response to selective activation of the first vibratory parts-transferring assembly, and in response to selective deactivation of the second vibratory parts-transferring assembly; and
    the second vibratory parts-transferring assembly being configured to selectively transfer the work piece along a second travel direction via the common parts-feeding path in response to selective activation of the second vibratory parts-transferring assembly, and in response to selective deactivation of the first vibratory parts-transferring assembly; and
    wherein the first travel direction and the second travel direction are opposite to each other, and are aligned along the common parts-feeding path.

2. The apparatus of claim 1, wherein:
  the work-piece feeding assembly is configured to select between a first vibration motion and a second vibration motion once the work piece becomes jammed while attempting to travel along the common parts-feeding path, in which:
the first vibration motion is utilized to urge movement of the work piece along the first travel direction via the common parts-feeding path; and
the second vibration motion is utilized to urge movement of the work piece along the second travel direction via the common parts-feeding path.

3. An apparatus, comprising:
a work-piece feeding assembly, including:
a first vibratory parts-transferring assembly having a first vibration unit configured to be selectively activated in such a way that the first vibration unit, in use, selectively vibrates the first vibratory parts-transferring assembly; this is done once the first vibration unit, in use, is selectively activated; and
a second vibratory parts-transferring assembly having a second vibration unit configured to be selectively activated in such a way that the second vibratory parts-transferring assembly, in use, selectively vibrates the second vibratory parts-transferring assembly once the second vibration unit, in use, is selectively activated; and
the first vibratory parts-transferring assembly and the second vibratory parts-transferring assembly having a common parts-feeding path; and
the first vibratory parts-transferring assembly being configured to selectively transfer a work piece along a first travel direction via the common parts-feeding path in response to selective activation of the first vibration unit, and in response to selective deactivation of the second vibration unit; and
the second vibratory parts-transferring assembly being configured to selectively transfer the work piece along a second travel direction via the common parts-feeding path in response to selective activation of the second vibration unit, and in response to selective deactivation of the first vibration unit; and
wherein the first travel direction and the second travel direction are opposite to each other, and are aligned along the common parts-feeding path.

4. The apparatus of claim 3, wherein:
the work-piece feeding assembly is configured to select between a first vibration motion of the first vibratory parts-transferring assembly and a second vibration motion of the second vibratory parts-transferring assembly once the work piece becomes jammed while attempting to travel along the common parts-feeding path, in which:
the first vibration motion is utilized to urge movement of the work piece along the first travel direction via the common parts-feeding path; and
the second vibration motion is utilized to urge movement of the work piece along the second travel direction via the common parts-feeding path.

5. The apparatus of claim 3, wherein:
the first vibratory parts-transferring assembly and the second vibratory parts-transferring assembly are positionable in a side-by-side arrangement to face each other.

6. The apparatus of claim 3, wherein:
the first vibration unit includes:
a first piezo device; and
a second piezo device; and
the first piezo device and the second piezo device are spaced apart from each other; and
a first plate support; and
a first plate assembly configured to be attachable to the first plate support; and
a first base assembly, in which the first piezo device and the second piezo device each are configured to vibrate the first plate assembly; and
the first base assembly and the first plate support are spaced apart from each other; and
the first base assembly connects to, spans between, first sections of the first piezo device and the second piezo device; and
the first plate support connects to, and spans between, second sections of the first piezo device and the second piezo device; and
the first base assembly, the first plate support, the first piezo device and the second piezo device are attached to each other and provide a first parallelogram structure.

7. The apparatus of claim 6, wherein:
the second vibration unit includes:
a first piezo mechanism; and
a second piezo mechanism; and
the first piezo mechanism and the second piezo mechanism are spaced apart from each other; and
a second plate support; and
a second plate assembly configured to be attachable to the second plate support; and
a second base assembly, in which the first piezo mechanism and the second piezo mechanism are each configured to vibrate the second plate assembly; and
the second base assembly and the second plate support are spaced apart from each other; and
the second base assembly connects to, and spans between, the first sections of the first piezo mechanism and the second piezo mechanism; and
the second plate support connects to, and spans between, the second sections of the first piezo mechanism and the second piezo mechanism; and
the second base assembly, the second plate support, the first piezo mechanism and the second piezo mechanism are attached to each other and provide a second parallelogram structure.

8. The apparatus of claim 7, wherein:
in a first operation mode:
the first vibration unit is activated, and the second vibration unit is deactivated; and
the work piece is urged to travel along the first travel direction.

9. The apparatus of claim 7, wherein:
the first plate assembly provides a first castellation formation extending along the first plate assembly; and
the second plate assembly provides a second castellation formation extending along the second plate assembly.

10. The apparatus of claim 9, wherein:
the first castellation formation of the first plate assembly and the second castellation formation of the second plate assembly are configured to interlace and mesh with each other once the first vibratory parts-transferring assembly and the second vibratory parts-transferring assembly are positioned side by side; and
the common parts-feeding path is aligned along overlapping sections of the first castellation formation and the second castellation formation; and
a gap is formed between the first castellation formation of the first plate assembly and the second castellation formation once the first vibration unit and the second vibration unit are positioned in a side-by-side relationship relative to each other.

11. The apparatus of claim 10, further comprising:
a first guide rail is mounted to the first plate assembly; and
a second guide rail is mounted to the second plate assembly; and
the first guide rail is spaced apart from the second guide rail; and
the common parts-feeding path is aligned parallel to the first guide rail and the second guide rail; and
the common parts-feeding path is aligned coaxially with the first guide rail and the second guide rail.

12. The apparatus of claim 11, wherein:
the first guide rail and the second guide rail are positioned adjacent to the first castellation formation and the second castellation formation, respectively; and
the first vibratory parts-transferring assembly and the second vibratory parts-transferring assembly are configured to be positioned adjacent, at least in part, to each other, and form the gap between the first castellation formation and the second castellation formation; and
the first vibratory parts-transferring assembly and the second vibratory parts-transferring assembly define the common parts-feeding path once the first vibratory parts-transferring assembly and the second vibratory parts-transferring assembly, in use, are positioned, at least in part, next to each other in a side-by-side arrangement.

13. The apparatus of claim 12, wherein:
once the first vibratory parts-transferring assembly is made to vibrate, the first plate assembly and the second plate assembly do not touch each other.

14. The apparatus of claim 7, wherein:
in a second operation mode:
the first vibration unit is deactivated; and
the second vibration unit is activated; and
the work piece is urged to travel along the second travel direction.

15. The apparatus of claim 14, wherein:
once the second vibratory parts-transferring assembly is made to vibrate, the second plate assembly and the first plate assembly do not touch each other.

16. The apparatus of claim 7, wherein:
in a third operation mode:
the first vibratory parts-transferring assembly and the second vibratory parts-transferring assembly are made to vibrate in unison, the work piece, in use, vibrates but the work piece is not urged to move progressively along.

17. The apparatus of claim 16, wherein:
once the first vibratory parts-transferring assembly and the second vibratory parts-transferring assembly are activated, the first plate assembly and the second plate assembly do not touch each other.

18. The apparatus of claim 7, wherein:
the second vibration unit is configured to be activated and the first vibration unit is configured to be activated once the work piece, in use, becomes jammed and is prevented from travelling along a second vibration motion via the common parts-feeding path; and
the second vibration unit is configured to be activated and the first vibration unit is configured to be deactivated once the work piece becomes unjammed, so that the work piece is permitted to travel along the second vibration motion via the common parts-feeding path.

19. The apparatus of claim 9, further comprising:
a cover assembly configured to cover, at least in part, the first castellation formation of the first plate assembly and the second castellation formation of the second plate assembly.

20. The apparatus of claim 19, further comprising:
a first guide rail is mounted to the first plate assembly; and
a second guide rail is mounted to the second plate assembly; and
the first guide rail is spaced apart from the second guide rail; and
the common parts-feeding path is aligned parallel to the first guide rail and the second guide rail; and
the common parts-feeding path is aligned coaxially with the first guide rail and the second guide rail; and
the cover assembly is positioned between the first guide rail and the second guide rail.

21. The apparatus of claim 19, wherein:
the cover assembly includes:
a first plate cover portion configured to be affixed to the first castellation formation of the first plate assembly; and
a second plate cover portion configured to be affixed to the first castellation formation of the first plate assembly; and
a third plate cover portion configured to be affixed to the second castellation formation of the second plate assembly; and
a fourth plate cover portion configured to be affixed to the second castellation formation of the second plate assembly; and
the first plate cover portion is spaced apart from the second plate cover portion; and
the third plate cover portion is spaced apart from the fourth plate cover portion; and
the fourth plate cover portion is positioned between the first plate cover portion and the second plate cover portion; and
the second plate cover portion is positioned between the third plate cover portion and the fourth plate cover portion.

* * * * *